(12) United States Patent
Mori et al.

(10) Patent No.: US 7,854,163 B2
(45) Date of Patent: Dec. 21, 2010

(54) WHEEL IDENTIFYING APPARATUS AND TIRE INFLATION PRESSURE DETECTING APPARATUS WITH FUNCTION OF WHEEL IDENTIFICATION

(75) Inventors: Masashi Mori, Oobu (JP); Nobuya Watabe, Nagoya (JP)

(73) Assignee: Denso Corporation, Kariya (JP)

( * ) Notice: Subject to any disclaimer, the term of this patent is extended or adjusted under 35 U.S.C. 154(b) by 465 days.

(21) Appl. No.: 12/149,589

(22) Filed: May 5, 2008

(65) Prior Publication Data

US 2008/0276701 A1 Nov. 13, 2008

(30) Foreign Application Priority Data

May 7, 2007 (JP) ............................. 2007-122391
May 7, 2007 (JP) ............................. 2007-122392

(51) Int. Cl.
*G01M 17/02* (2006.01)
(52) U.S. Cl. ...................................................... 73/146
(58) Field of Classification Search ................ None
See application file for complete search history.

(56) References Cited

U.S. PATENT DOCUMENTS

| | | | |
|---|---|---|---|
| 5,602,524 A | 2/1997 | Mock et al. | |
| 6,018,993 A | 2/2000 | Normann et al. | |
| 6,181,241 B1 | 1/2001 | Normann et al. | |
| 6,489,888 B1 | 12/2002 | Honeck et al. | |
| 6,879,252 B2 * | 4/2005 | DeZorzi et al. | 340/505 |
| 6,885,293 B2 * | 4/2005 | Okumura | 340/448 |
| 6,963,274 B2 * | 11/2005 | Saheki et al. | 340/447 |
| 7,032,441 B2 | 4/2006 | Kanatani et al. | |
| 7,131,323 B2 * | 11/2006 | Hirota | 73/146 |
| 7,696,861 B2 * | 4/2010 | Mori et al. | 340/426.33 |

(Continued)

FOREIGN PATENT DOCUMENTS

JP H07-507513 8/1995

(Continued)

OTHER PUBLICATIONS

Korean Office Action dated Apr. 26 2010, issued in corresponding Korean Application No. 10-2008-41802, with English translation.

(Continued)

*Primary Examiner*—Lisa M Caputo
*Assistant Examiner*—Jermaine Jenkins
(74) *Attorney, Agent, or Firm*—Nixon & Vanderhye PC

(57) ABSTRACT

A wheel identifying apparatus includes first and second triggering devices located on the body of a vehicle, a plurality of transceivers each of which is located on one of the running and spare wheels of the vehicle, and a receiver and a wheel identifier both of which are located on the body of the vehicle. The first and second triggering devices continuously transmit first and second trigger signals, respectively. Each of the transceivers monitors the strength of either the first or second trigger signal thereat for a given length of time, and transmits a signal indicating variation in the monitored strength. The receiver receives and provides to the wheel identifier all the signals transmitted by the transceivers. The wheel identifier identifies, for each of the signals, the wheel on which the transceiver having transmitted the signal is located through a comparison between the variations indicated by the signals.

36 Claims, 13 Drawing Sheets

U.S. PATENT DOCUMENTS

| | | |
|---|---|---|
| 2003/0107481 A1 | 6/2003 | Sawafuji |
| 2005/0172707 A1* | 8/2005 | Kanatani et al. ............... 73/146 |
| 2006/0187013 A1 | 8/2006 | Jost |
| 2007/0008097 A1 | 1/2007 | Mori et al. |
| 2007/0090970 A1 | 4/2007 | Watabe |
| 2007/0205883 A1 | 9/2007 | Mori et al. |
| 2008/0157950 A1* | 7/2008 | Mori et al. .................. 340/438 |

FOREIGN PATENT DOCUMENTS

| | | |
|---|---|---|
| JP | 2003-154825 | 5/2003 |
| JP | 2003-175711 | 6/2003 |
| JP | 2003-306017 | 10/2003 |
| JP | 2005-170133 | 6/2005 |
| JP | 2006-062444 | 3/2006 |
| JP | 2007-015491 | 1/2007 |
| JP | 2007-230416 | 9/2007 |
| KR | 10-2007-0005518 | 1/2007 |
| WO | WO 03/089260 | 10/2003 |

OTHER PUBLICATIONS

Chinese Office Action dated Aug. 10, 2009, issued in corresponding Chinese Application No. 200810095651.8, with English translation.

* cited by examiner

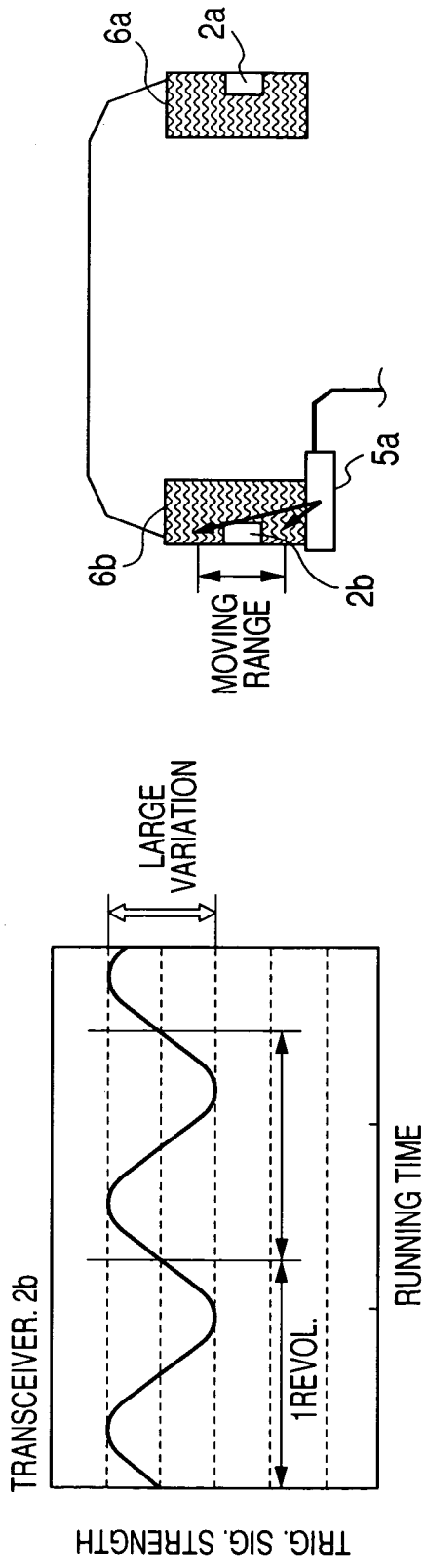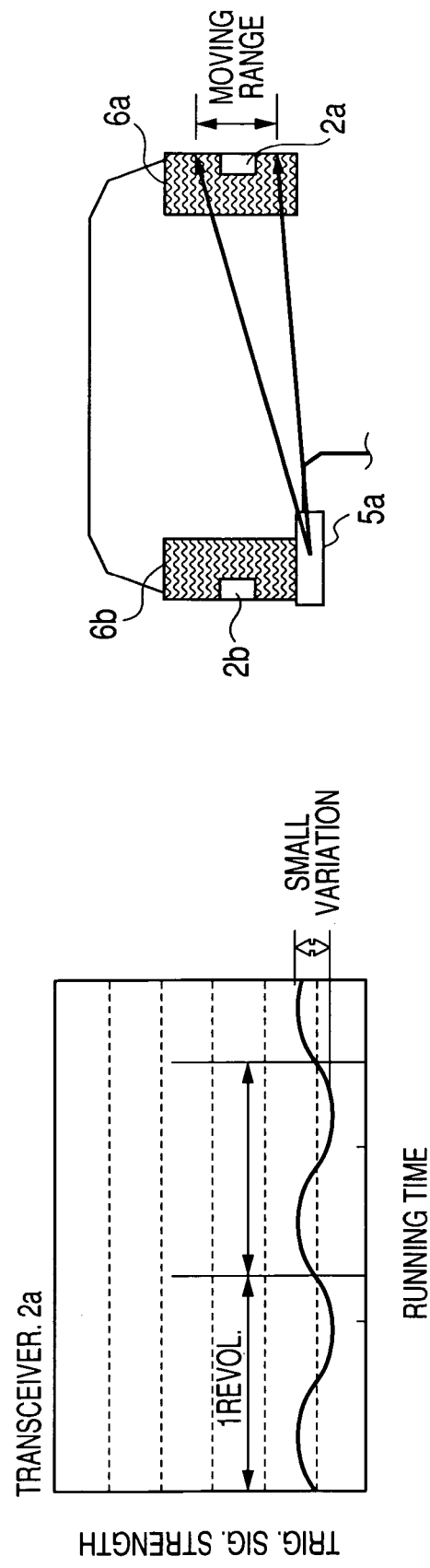

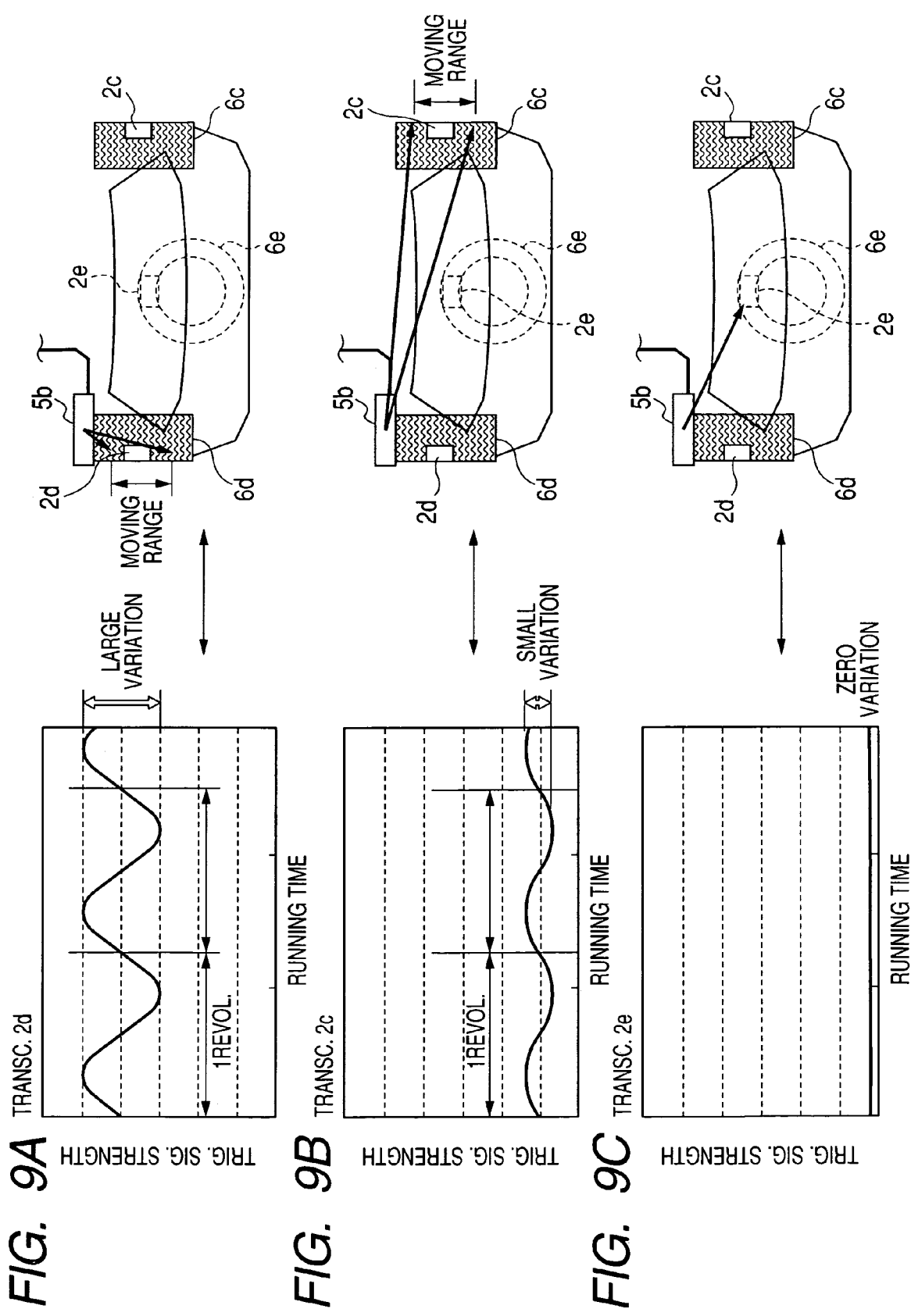

WHEEL IDENTIFYING APPARATUS AND TIRE INFLATION PRESSURE DETECTING APPARATUS WITH FUNCTION OF WHEEL IDENTIFICATION

CROSS-REFERENCE TO ELATED APPLICATIONS

This application is based on and claims priority from Japanese Patent Applications No. 2007-122391, filed on May 7, 2007, and No. 2007-122392, filed on May 7, 2007, the contents of which are hereby incorporated by reference into this application.

BACKGROUND OF THE INVENTION

1. Technical Field of the Invention

The present invention relates generally to tire inflation pressure detecting apparatuses for detecting the inflation pressures of tires on a vehicle and tire location detecting apparatuses for automatically detecting the locations of tires on a vehicle. More particularly, the invention relates to a direct-type tire inflation pressure detecting apparatus which has a function of wheel identification.

2. Description of the Related Art

A direct-type tire inflation pressure detecting apparatus generally includes a plurality of transmitters (or transceivers) and a receiver.

Each of the transmitters is directly mounted on one of a plurality of wheels of a vehicle and includes a pressure sensor for sensing the inflation pressure of a tire fitted on the wheel. Each of the transmitters is configured to transmit a pressure signal representative of the inflation pressure of the tire sensed by the pressure sensor.

The receiver is mounted on the body of the vehicle and includes at least one antenna. The receiver is configured to receive, via the antenna, the pressure signals transmitted from the transmitters and determine the inflation pressures of the tires based on the received pressure signals.

In the above apparatus, the receiver may also receive pressure signals transmitted by external transmitters (e.g., transmitters mounted on wheels of other vehicles). However, it is impossible for the receiver to determine whether a pressure signal received thereby has been transmitted by one of the transmitters of the apparatus or by an external transmitter. Moreover, it is also impossible for the receiver to detect the locations of the transmitters (or the locations of the associated tires) on the vehicle. In other words, the receiver cannot identify the wheel on which the transmitter having transmitted a pressure signal and the tire whose inflation pressure is indicated by the pressure signal are located.

To solve the above problems, as disclosed in U.S. Pat. No. 5,602,524, each of the transmitters may be further configured to transmit an identification signal (to be referred to as ID signal hereinafter) representative of the identity thereof along with the pressure signal. On the other hand, the receiver may be further configured to have reference ID signals registered therein, each of which coincides with the ID signal of one of the transmitters and is associated with the location of that transmitter.

Thus, the receiver can compare an ID signal received thereby with the reference ID signals registered therein and identify the transmitter which has transmitted the ID signal when the ID signal coincides with one of the reference ID signals.

Consequently, the receiver can identify the wheel on which the identified transmitter is mounted. More specifically, the receiver can determine whether the wheel is a FR (front-right), a FL (front-left), a RR (rear-right), or a RL (rear-left) wheel of the vehicle. Further, the receiver can determine the inflation pressure of the tire fitted on the identified wheel based on the pressure signal received along with the ID signal.

However, with the above configuration, it is required to previously register the ID signals specific to the respective transmitters as reference ID signals in the receiver through associating the ID signals with the locations of the respective transmitters on the vehicle (i.e., the wheels on which the respective transmitters are mounted). Moreover, as tire replacement or rotations are performed, it is required to update the reference ID signals in the receiver.

Conventionally, the registration of the ID signals in the receiver is made through a time-consuming manual operation. Thus, it is desired to automatically make the ID registration. Further, for automatically making the ID registration, it is desired to automatically detect the locations of the transmitters, in other words, to automatically identify the wheel on which each of the transmitters (or each of the associated tires) is located.

To meet the above desires, US Patent Application Publication No. 2007/0008097 A1 discloses a wheel identifying apparatus. This apparatus includes a plurality of transceivers, each of which is located on one of a plurality of wheels of a vehicle, at least one triggering device that is mounted on the body of the vehicle at different distances from the transceivers, and a receiver located on the body of the vehicle. The triggering device transmits a trigger signal whose strength attenuates with increase in the distance from the triggering device. Therefore, the strengths of the trigger signal at the transceivers are different from each other. In response to receipt of the trigger signal, each of the transceivers determines the strength of the trigger signal thereat and transmits a response signal which conveys signal strength information on the determined strength of the trigger signal. The receiver receives the response signals transmitted by the transceivers and identifies, for each of the received response signals, the wheel on which the transceiver having transmitted the response signal is located based on the signal strength information conveyed by the response signal.

Further, as an application to a four-wheel vehicle, the wheel identification apparatus includes a first triggering device and a second triggering device. The first triggering device is mounted on the body of the vehicle closer to the front wheels of the vehicle than the rear wheels, so as to transmit a first trigger signal only to the transceivers located on the front wheels (i.e., the FR and FL wheels). Further, the first triggering device is mounted at different distances from the front wheels, so that strengths of the first trigger signal at the transceivers on the front wheels are different from each other. Thus, the receiver can identify, for each of the transceivers on the front wheels, the wheel on which the transceiver is located based on the strength of the first trigger signal at the transceiver. On the other hand, the second triggering device is mounted on the body of the vehicle closer to the rear wheels of the vehicle than the front wheels, so as to transmit a second trigger signal only to the transceivers located on the rear wheels (i.e., RR and RL wheels). Further, the second triggering device is mounted at different distances from the rear wheels, so that strengths of the second trigger signal at the transceivers on the rear wheels are different from each other. Thus, the receiver can identify, for each of the transceivers on the rear wheels, the wheel on which the transceiver is located based on the strength of the second trigger signal at the transceiver.

With the above configuration, however, when a spare wheel is provided on the body of the vehicle in the vicinity of the rear wheels and also has a transceiver mounted thereon, the second trigger signal may be received by all the three transceivers on the rear and spare wheels. In this case, since the strength of the second trigger signal at the spare wheel is not so different from those at the transceivers on the rear wheels, it is difficult for the receiver to distinguish the three transceivers on the rear and spare wheels based on the strengths of the second trigger signal thereat.

Japanese Patent No. 3815305 discloses a tire pressure monitoring system which can determine whether a transmitter is located on a running or spare wheel of a vehicle. More specifically, in this system, each of all the transmitters on the running and spare wheels of the vehicle includes a rotation detecting means which detects rotation of the corresponding wheel by detecting a centrifugal force and outputs a rotation signal indicative of whether the corresponding wheel is rotating or not. Thus, a controller located on the body of the vehicle can determine, for each of all the transmitters, whether it is located on one of the running wheels or the spare wheel of the vehicle based on the rotation signal output from the transmitter.

However, in general, when the vehicle is running at a speed lower than 30 km/h, it is difficult to detect the centrifugal force and thus difficult to distinguish the transmitter on the spare wheel from those on the running wheels of the vehicle based on the rotation signals output from the transmitters.

SUMMARY OF THE INVENTION

According to a first aspect of the present invention, there is provided a wheel identifying apparatus for a vehicle which includes a body, two front wheels, two rear wheels, and a spare wheel located on the body closer to the rear wheels than the front wheels. The wheel identifying apparatus includes: a first triggering device that is located on the body of the vehicle closer to the front wheels than the rear wheels and at different distances from the front wheels; a second triggering device that is located on the body of the vehicle closer to the rear wheels than the front wheels and at different distances from the rear wheels; five transceivers each of which is located on a corresponding one of the five wheels of the vehicle away from the rotational axis of the corresponding wheel; a receiver located on the body of the vehicle; and a wheel identifier located on the body of the vehicle. Further, the wheel identifying apparatus is so configured that: the first triggering device continuously transmits a first trigger signal to the transceivers on the front wheels for a first predetermined time period during running of the vehicle; in response to receipt of the first trigger signal, each of the transceivers on the front wheels monitors the strength of the first trigger signal thereat for a given length of time, determines a first physical quantity which represents variation in the monitored strength of the first trigger signal, and transmits a first response signal which indicates the determined first physical quantity; the receiver receives the two first response signals respectively transmitted by the transceivers on the front wheels; the wheel identifier identifies, for each of the two first response signals received by the receiver, the front wheel on which the transceiver having transmitted the first response signal is located through a comparison between the first physical quantities indicated by the two first response signals; the second triggering device continuously transmits a second trigger signal to the three transceivers on the rear and spare wheels for a second predetermined time period during running of the vehicle; in response to receipt of the second trigger signal, each of the three transceivers on the rear and spare wheels monitors the strength of the second trigger signal thereat for the given length of time, determines a second physical quantity which represents variation in the monitored strength of the second trigger signal, and transmits a second response signal which indicates the determined second physical quantity; the receiver receives the three second response signals respectively transmitted by the three transceivers on the rear and spare wheels; and the wheel identifier identifies, for each of the three second response signals received by the receiver, the one of the rear and spare wheels on which the transceiver having transmitted the second response signal is located through a comparison between the second physical quantities indicated by the three second response signals.

According to a second aspect of the present invention, there is provided a wheel identifying apparatus for a vehicle which includes a body, two front wheels, two rear wheels, and a spare wheel located on the body closer to the rear wheels than the front wheels. The wheel identifying apparatus includes: a first triggering device that is located on the body of the vehicle closer to the front wheels than the rear wheels and at different distances from the front wheels; a second triggering device that is located on the body of the vehicle closer to the rear wheels than the front wheels and at different distances from the rear wheels; five transceivers each of which is located on a corresponding one of the five wheels of the vehicle away from the rotational axis of the corresponding wheel; a monitoring time setter located on the body of the vehicle; a receiver located on the body of the vehicle; and a wheel identifier located on the body of the vehicle. Further, the wheel identifying apparatus is so configured that: the monitoring time setter sets a monitoring time according to a running speed of the vehicle; the first triggering device continuously transmits a first trigger signal to the transceivers on the front wheels for a first predetermined time period during running of the vehicle, the first trigger signal indicating the monitoring time set by the monitoring time setter; in response to receipt of the first trigger signal, each of the transceivers on the front wheels monitors the strength of the first trigger signal thereat for the monitoring time indicated by the first trigger signal, determines a first physical quantity which represents variation in the monitored strength of the first trigger signal, and transmits a first response signal which indicates the determined first physical quantity; the receiver receives the two first response signals respectively transmitted by the transceivers on the front wheels; the wheel identifier identifies, for each of the two first response signals received by the receiver, the front wheel on which the transceiver having transmitted the first response signal is located through a comparison between the first physical quantities indicated by the two first response signals; the second triggering device continuously transmits a second trigger signal to the three transceivers on the rear and spare wheels for a second predetermined time period during running of the vehicle, the second trigger signal also indicating the monitoring time set by the monitoring time setter; in response to receipt of the second trigger signal, each of the three transceivers on the rear and spare wheels monitors the strength of the second trigger signal thereat for the monitoring time indicated by the second trigger signal, determines a second physical quantity which represents variation in the monitored strength of the second trigger signal, and transmits a second response signal which indicates the determined second physical quantity; the receiver receives the three second response signals respectively transmitted by the three transceivers on the rear and spare wheels; and the wheel identifier identifies, for each of the three second response signals received by the receiver, that one of the rear and spare wheels on which the transceiver having transmitted the second response signal is located through a comparison between the second physical quantities indicated by the three second response signals.

According to a third aspect of the present invention, there is provided a wheel identifying apparatus for a vehicle which includes a body, two front wheels, two rear wheels, and a spare wheel located on the body closer to the rear wheels than the front wheels. The wheel identifying apparatus includes: a first triggering device that is located on the body of the vehicle closer to the front wheels than the rear wheels and at different distances from the front wheels; a second triggering device that is located on the body of the vehicle closer to the rear wheels than the front wheels and at different distances from the rear wheels; five transceivers each of which is located on a corresponding one of the five wheels of the vehicle away from the rotational axis of the corresponding wheel; a receiver located on the body of the vehicle; and a wheel identifier located on the body of the vehicle. Further, the wheel identifying apparatus is so configured that: the first triggering device continuously transmits a first trigger signal to the transceivers on the front wheels for a first predetermined time period during running of the vehicle; in response to receipt of the first trigger signal, each of the transceivers on the front wheels monitors the strength of the first trigger signal thereat for a given length of time, determines a value of the monitored strength of the first trigger signal, and transmits a first response signal which indicates the determined value of the strength of the first trigger signal; the receiver receives the two first response signals respectively transmitted by the transceivers on the front wheels; the wheel identifier identifies, for each of the two first response signals received by the receiver, the front wheel on which the transceiver having transmitted the first response signal is located through a comparison between the values of the strength of the first trigger signal indicated by the two first response signals; the second triggering device continuously transmits a second trigger signal to the three transceivers on the rear and spare wheels for a second predetermined time period during running of the vehicle; in response to receipt of the second trigger signal, each of the three transceivers on the rear and spare wheels monitors the strength of the second trigger signal thereat for the given length of time, determines a value of the monitored strength of the second trigger signal, determines a physical quantity which represents variation in the monitored strength of the second trigger signal, and transmits a second response signal which indicates both the determined value of the strength of the second trigger signal and the determined physical quantity; the receiver receives the three second response signals respectively transmitted by the three transceivers on the rear and spare wheels; and the wheel identifier identifies, for each of the three second response signals received by the receiver, that one of the rear and spare wheels on which the transceiver having transmitted the second response signal is located through comparisons between the values of the strength of the second trigger signal indicated by the three second response signals and between the physical quantities indicated by the three second response signals.

According to a fourth aspect of the present invention, there is provided a wheel identifying apparatus for a vehicle which includes a body, two front wheels, two rear wheels, and a spare wheel located on the body closer to the rear wheels than the front wheels. The wheel identifying apparatus includes: a first triggering device that is located on the body of the vehicle closer to the front wheels than the rear wheels and at different distances from the front wheels; a second triggering device that is located on the body of the vehicle closer to the rear wheels than the front wheels and at different distances from the rear wheels; five transceivers each of which is located on a corresponding one of the five wheels of the vehicle away from the rotational axis of the corresponding wheel; a monitoring time setter located on the body of the vehicle; a receiver located on the body of the vehicle; and a wheel identifier located on the body of the vehicle. Further, the wheel identifying apparatus is so configured that: the monitoring time setter sets a monitoring time according to a running speed of the vehicle; the first triggering device continuously transmits a first trigger signal to the transceivers on the front wheels for a first predetermined time period during running of the vehicle, the first trigger signal indicating the monitoring time set by the monitoring time setter; in response to receipt of the first trigger signal, each of the transceivers on the front wheels monitors the strength of the first trigger signal thereat for the monitoring time indicated by the first trigger signal, determines a value of the monitored strength of the first trigger signal, and transmits a first response signal which indicates the determined value of the strength of the first trigger signal; the receiver receives the two first response signals respectively transmitted by the transceivers on the front wheels; the wheel identifier identifies, for each of the two first response signals received by the receiver, the front wheel on which the transceiver having transmitted the first response signal is located through a comparison between the values of the strength of the first trigger signal indicated by the two first response signals; the second triggering device continuously transmits a second trigger signal to the three transceivers on the rear and spare wheels for a second predetermined time period during running of the vehicle, the second trigger signal also indicating the monitoring time set by the monitoring time setter; in response to receipt of the second trigger signal, each of the three transceivers on the rear and spare wheels monitors the strength of the second trigger signal thereat for the monitoring time indicated by the second trigger signal, determines a value of the monitored strength of the second trigger signal, determines a physical quantity which represents variation in the monitored strength of the second trigger signal, and transmits a second response signal which indicates both the determined value of the strength of the second trigger signal and the determined physical quantity; the receiver receives the three second response signals respectively transmitted by the three transceivers on the rear and spare wheels; and the wheel identifier identifies, for each of the three second response signals received by the receiver, that one of the rear and spare wheels on which the transceiver having transmitted the second response signal is located through comparisons between the values of the strength of the second trigger signal indicated by the three second response signals and between the physical quantities indicated by the three second response signals.

According to a fifth aspect of the present invention, there is provided a wheel identifying apparatus which includes: two transceivers that are respectively located on two running wheels of a vehicle away from the rotational axis of the respective wheel; a triggering device located on a body of the vehicle at different distances from the running wheels; a receiver located on the body of the vehicle; and a wheel identifier located on the body of the vehicle. Further, the wheel identifying apparatus is so configured that: the triggering device continuously transmits a trigger signal to the transceivers for a predetermined time period during running of the vehicle; in response to receipt of the trigger signal, each of the transceivers monitors the strength of the trigger signal thereat for a given length of time, determines a physical quantity which represents variation in the monitored strength of the trigger signal, and transmits a response signal which indicates the determined physical quantity; the receiver receives and provides to the wheel identifier the two response signals transmitted by the two transceivers; and the wheel identifier identifies that one of the two transceivers which has transmitted the response signal indicating the larger physical quantity as being located on the closer one of the two running wheels to the triggering device, and the other as being located on the other running wheel.

According to a sixth aspect of the present invention, there is provided a wheel identifying apparatus which includes: two transceivers that are respectively located on two running wheels of a vehicle away from the rotational axis of the respective wheel; a triggering device located on a body of the vehicle at different distances from the running wheels; a monitoring time setter located on the body of the vehicle; a receiver located on the body of the vehicle; and a wheel identifier located on the body of the vehicle. Further, the wheel identifying apparatus is so configured that: the monitoring time setter sets a monitoring time according to a running speed of the vehicle; the triggering device continuously transmits a trigger signal to the transceivers for a predetermined time period during running of the vehicle, the trigger signal indicating the monitoring time set by the monitoring time setter; in response to receipt of the trigger signal, each of the transceivers monitors the strength of the trigger signal thereat for the monitoring time indicated by the trigger signal, determines a physical quantity which represents variation in the monitored strength of the trigger signal, and transmits a response signal which indicates the determined physical quantity; the receiver receives and provides to the wheel identifier the two response signals transmitted by the two transceivers; and the wheel identifier identifies that one of the two transceivers which has transmitted the response signal indicating the larger physical quantity as being located on the closer one of the two running wheels to the triggering device, and the other as being located on the other running wheel.

According to a seventh aspect of the present invention, there is provided a wheel identifying apparatus which includes: two transceivers that are respectively located on a running wheel and a spare wheel of a vehicle away from the rotational axis of the respective wheel; a triggering device located on a body of the vehicle; a receiver located on the body of the vehicle; and a wheel identifier located on the body of the vehicle. Further, the wheel identifying apparatus is so configured that: the triggering device continuously transmits a trigger signal to the transceivers for a predetermined time period during running of the vehicle; in response to receipt of the trigger signal, each of the transceivers monitors the strength of the trigger signal thereat for a given length of time, determines a physical quantity which represents variation in the monitored strength of the trigger signal, and transmits a response signal which indicates the determined physical quantity; the receiver receives and provides to the wheel identifier the two response signals transmitted by the two transceivers; and the wheel identifier identifies that one of the two transceivers which has transmitted the response signal indicating the smaller physical quantity as being located on the spare wheel, and the other as being located on the running wheel.

According to an eighth aspect of the present invention, there is provided a wheel identifying apparatus which includes: two transceivers that are respectively located on a running wheel and a spare wheel of a vehicle away from the rotational axis of the respective wheel; a triggering device located on a body of the vehicle; a monitoring time setter located on the body of the vehicle; a receiver located on the body of the vehicle; and a wheel identifier located on the body of the vehicle. Further, the wheel identifying apparatus is so configured that: the monitoring time setter sets a monitoring time according to a running speed of the vehicle; the triggering device continuously transmits a trigger signal to the transceivers for a predetermined time period during running of the vehicle, the trigger signal indicating the monitoring time set by the monitoring time setter; in response to receipt of the trigger signal, each of the transceivers monitors the strength of the trigger signal thereat for the monitoring time indicated by the trigger signal, determines a physical quantity which represents variation in the monitored strength of the trigger signal, and transmits a response signal which indicates the determined physical quantity; the receiver receives and provides to the wheel identifier the two response signals transmitted by the two transceivers; and the wheel identifier identifies that one of the two transceivers which has transmitted the response signal indicating the smaller physical quantity as being located on the spare wheel, and the other transceiver as being located on the running wheel.

BRIEF DESCRIPTION OF THE DRAWINGS

The present invention will be understood more fully from the detailed description given hereinafter and from the accompanying drawings of preferred embodiments of the invention, which, however, should not be taken to limit the invention to the specific embodiments but are for the purpose of explanation and understanding only.

In the accompanying drawings:

FIG. 8A is a schematic view illustrating both variation in the distance between a first triggering device 5a and a transceiver 2b and variation in the strength at the transceiver 2b of a first trigger signal transmitted by the first triggering device 5a in the tire inflation pressure detecting apparatus;

FIG. 8B is a schematic view illustrating both variation in the distance between the first triggering device 5a and a transceiver 2a and variation in the strength of the first trigger signal at the transceiver 2a in the tire inflation pressure detecting apparatus;

FIG. 9A is a schematic view illustrating both variation in the distance between a second triggering device 5b and a transceiver 2d and variation in the strength at the transceiver 2d of a second trigger signal transmitted by the second triggering device 5b in the tire inflation pressure detecting apparatus;

FIG. 9B is a schematic view illustrating both variation in the distance between the second triggering device 5b and a transceiver 2c and variation in the strength of the second trigger signal at the transceiver 2c in the tire inflation pressure detecting apparatus;

FIG. 9C is a schematic view illustrating both variation in the distance between the second triggering device 5b and a transceiver 2e and variation in the strength of the second trigger signal at the transceiver 2e in the tire inflation pressure detecting apparatus;

DESCRIPTION OF PREFERRED EMBODIMENTS

Figure 1:
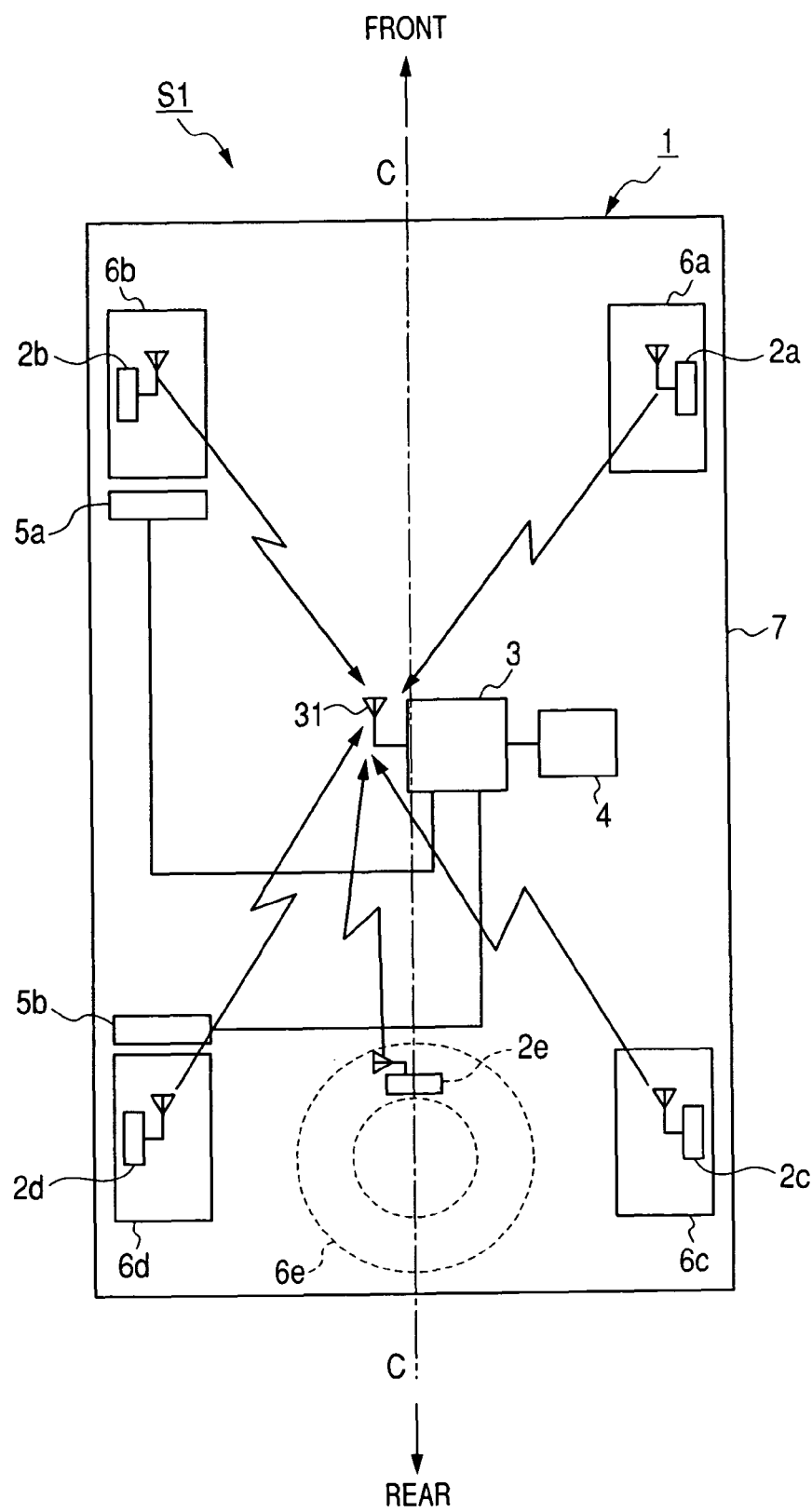
FIG. 1 is a schematic view showing the overall configuration of a tire inflation pressure detecting apparatus for a vehicle according to the first embodiment of the invention.

Preferred embodiments of the present invention will be described hereinafter with reference to FIGS. 1-15.

It should be noted that, for the sake of clarity and understanding, identical components having identical functions in different embodiments of the invention have been marked, where possible, with the same reference numerals in each of the figures.

First Embodiment

FIG. 1 shows the overall configuration of a tire inflation pressure detecting apparatus S1 according the first embodiment of the invention, which also functions as a wheel identifying apparatus.

The tire inflation pressure detecting apparatus S1 is installed to a vehicle 1 which includes four running wheels 6a-6d (i.e., the FR wheel 6a, the FL wheel 6b, the RR wheel 6c, and the RL wheel 6d) and a spare wheel 6e that is disposed in the rear trunk of the vehicle 1.

As shown in FIG. 1, the tire inflation pressure detecting apparatus S1 includes five transceivers 2a-2e, a receiver 3, a warning device 4, and first and second triggering devices 5a and 5b that respectively transmit first and second trigger signals.

The transceivers 2a-2e are respectively mounted on the five wheels 6a-6e of the vehicle 1, so as to respectively have association with the tires fitted on the wheels 6a-6e.

Each of the transceivers 2a-2e senses the inflation pressure of the associated tire and transmits a frame that contains tire pressure information indicative of the sensed inflation pressure of the associated tire.

Figure 2A:
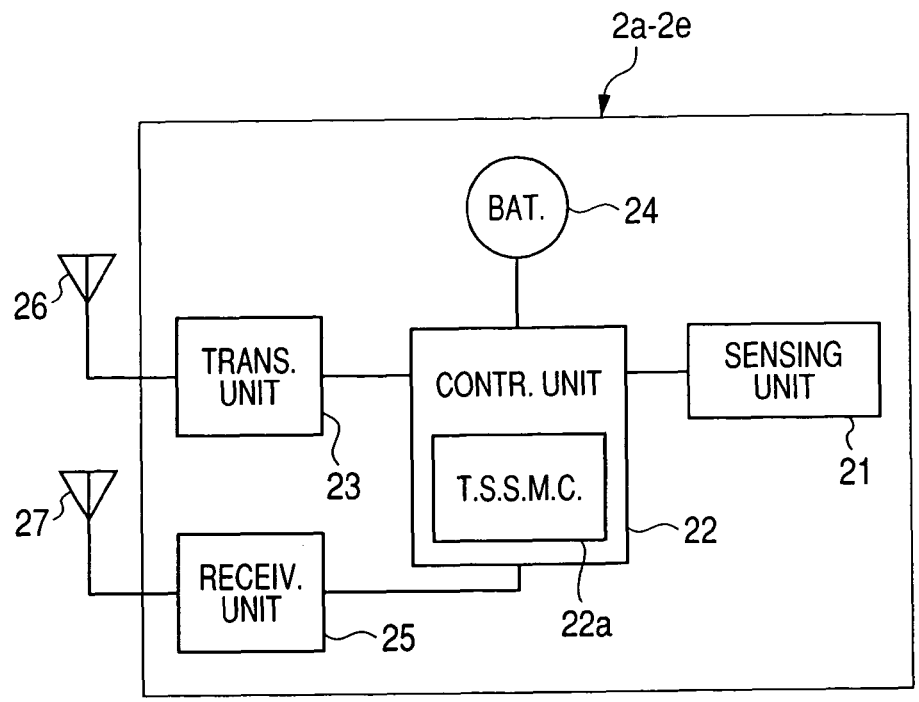
FIG. 2A is a functional block diagram showing the configuration of each of transceivers of the tire inflation pressure detecting apparatus.

Referring to FIG. 2A, each of the transceivers 2a-2e is configured with a sensing unit 21, a controlling unit 22, a transmitting unit 23, a battery 24, a receiving unit 25, a transmitting antenna 26, and a receiving antenna 27.

The sensing unit 21 includes sensors, such as a diaphragm-type pressure sensor and a temperature sensor, and outputs signals representative of the inflation pressure and internal temperature of the associated tire sensed by the pressure sensor and temperature sensor.

The controlling unit 22 is configured with a microcomputer of a well-known type which includes a CPU, a ROM, a RAM, and I/O devices. The controlling unit 22 performs predetermined processes in accordance with a program installed in the ROM.

Specifically, the controlling unit 22 receives the signals output from the sensing unit 21 and processes those signals. The controlling unit 22 then assembles the frame which contains the tire pressure information indicative of the sensed inflation pressure of the associated tire, and provides the frame to the transmitting unit 23.

The controlling unit 22 is normally in a "sleep" mode, and switched from the sleep mode to a "wake-up" mode upon input of an activation command which is contained in the first or second trigger signal received by the receiving unit 25.

Moreover, the controlling unit 22 includes a trigger signal strength monitoring circuit 22a (abbreviated to T.S.S.M.C. in FIG. 2A) that monitors, in the wake-up mode, the strength of the received first or second trigger signal for a given length of time. The trigger signal strength monitoring circuit 22a also determines both the mean value of the monitored strength and the amplitude of variation in the monitored strength for the given length of time.

In the present embodiment, the amplitude is determined as a physical quantity representing the variation in the monitored strength of the first or second trigger signal, and the given length of time is so set as to allow the associated wheel to make more than one revolution during it.

The controlling unit 22 further assembles into the frame, which contains the tire pressure information, both mean strength information indicative of the determined mean value of the strength of the first or second trigger signal and strength variation amplitude information indicative of the determined amplitude of variation in the strength of the first or second trigger signal.

Figure 3:
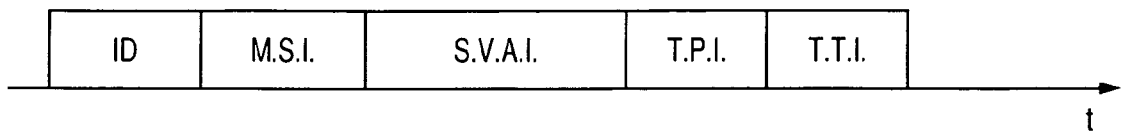
FIG. 3 is a schematic view illustrating the format of a frame transmitted by each of the transceivers.

FIG. 3 illustrates a format of the frame according to the present embodiment. As illustrated, there are sequentially arranged in the frame ID information indicative of the identity of the each of the transceivers 2a-2e, the mean strength information (abbreviated to M.S.I. in FIG. 3), the strength variation amplitude information (abbreviated to S.V.A.I. in FIG. 3), the tire pressure information (abbreviated to T.P.I. in FIG. 3), and tire temperature information (abbreviated to T.T.I. in FIG. 3) indicative of the internal temperature of the associated tire sensed by the sensing unit 21.

It should be noted that the mean strength information and strength variation amplitude information may also be contained in another frame and separately transmitted to the receiver 3 from the tire pressure information and tire temperature information.

The controlling unit 22 also controls the timing at which the transmitting unit 23 transmits the frame, so as to avoid any interference at the receiver 3 between the frames transmitted by different ones of the transceivers 2a-2e. More specifically, in the present embodiment, the controlling unit 22 sets a waiting time as a function of the mean value of the strength of the first or second trigger signal, and controls the transmitting unit 23 to transmit the frame after elapse of the waiting time from the receipt of the first or second trigger signal by the receiving unit 25.

In addition, the waiting time may also be set randomly, so as to allow all the transceivers 2a-2e to transmit the respective frames at different times, thereby avoiding any interference between the frames at the receiver 3.

The transmitting unit 23 transmits, under control of the controlling unit 22 and via the transmitting antenna 26, the frame provided by the controlling unit 22 to the receiver 3 at a radio frequency of, for example, 310 MHz.

The receiving unit 25 receives, via the receiving antenna 27, the first or second trigger signal and provides the received trigger signal to the controlling unit 22.

The battery 24 is provided to supply electrical power necessary for operations of the other units.

The above-described transceivers 2a-2e are each fixed to an air valve of the associated one of the wheels 6a-6e, with at least the sensing unit 21 thereof being exposed to the air inside the associated tire.

On the other hand, the receiver 3 is mounted on the body 7 of the vehicle 1. The receiver 3 receives all the frames transmitted by the transceivers 2a-2e, and determines the inflation pressures of the associated tires based on the tire pressure information contained in the frames. The receiver 3 also identifies, for each of the received frames, the wheel on which the transceiver (i.e., one of the transceivers 2a-2e) having transmitted the frame is mounted. The receiver 3 further controls the first and second triggering devices 5a and 5b to respectively transmit the first and second trigger signals.

Figure 2B:
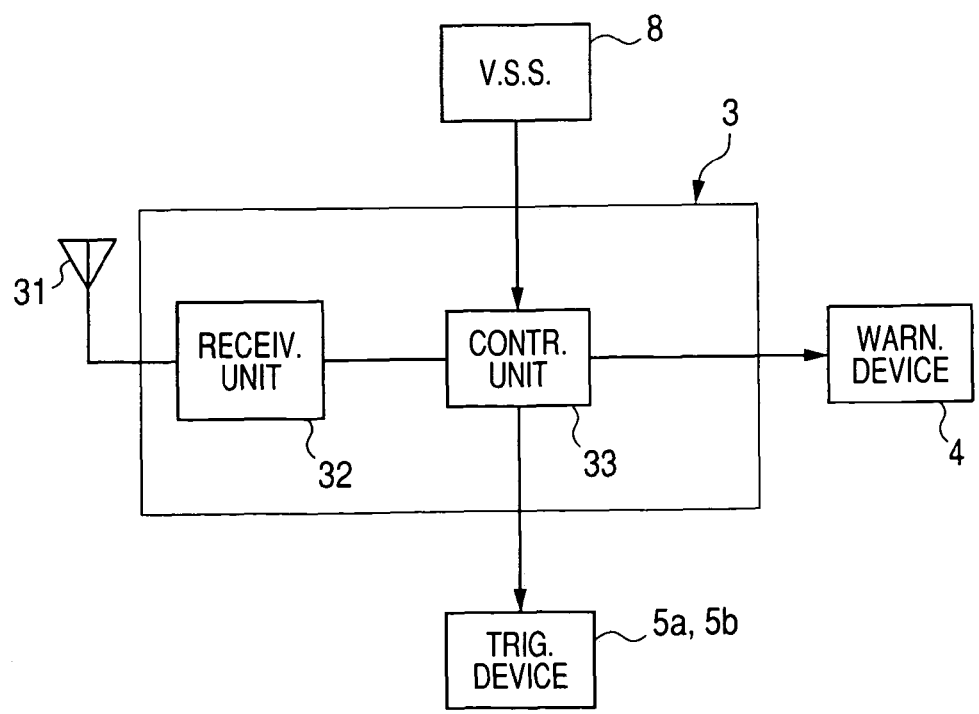
FIG. 2B is a functional block diagram showing the configuration of a receiver of the tire inflation pressure detecting apparatus.

Referring to FIG. 2B, the receiver 3 is configured with a receiving antenna 31, a receiving unit 32, and a controlling unit 33.

The receiving antenna 31 is fixed to the body 7 of the vehicle 1 for receiving, as illustrated in FIG. 1, all the frames transmitted by the five transceivers 2a-2e.

The receiving unit 32 receives, via the receiving antenna 31, all the frames transmitted by the transceivers 2a-2e and provides the received frames to the controlling unit 33.

The controlling unit 33 is configured with a microcomputer of a well-known type which includes a CPU, a ROM, a RAM, and I/O devices. The controlling unit 33 performs predetermined processes in accordance with a program installed in the ROM thereof.

Specifically, the controlling unit 33 outputs a first command signal for causing the first triggering device 5a to transmit the first trigger signal, and a second command signal for causing the second triggering device 5b to transmit the second trigger signal. The controlling unit 33 also identifies, for each of the frames received from the receiving unit 32, the wheel on which the transceiver (i.e., one of the transceivers 2a-2e) having transmitted the frame is mounted based on the mean strength information and strength variation amplitude information contained in the frame.

In the present embodiment, the controlling unit 33 receives a vehicle speed signal output from a vehicle speed sensor 8 (abbreviated to V.S.S. in FIG. 2B) and determines the running speed Vs of the vehicle 1 based on the received vehicle speed signal. The controlling unit 33 outputs the first and second command signals to the first and second triggering devices 5a and 5b only when the running speed Vs of the vehicle 1 exceeds a predetermined value (e.g., 5 km/h).

In addition, it is also possible to determine the running speed Vs of the vehicle 1 by other means. For example, the running speed Vs may also be determined based on a rotational speed signal which is output from a rotational speed sensor for sensing the rotational speed of one of the running wheels 6a-6e of the vehicle 1.

The controlling unit 33 further determines, for each of the frames received from the receiving unit 32, the inflation pressure of the associated tire based on the tire pressure information contained in the frame.

Thus, both the inflation pressure and location of each of the five tires can be determined by the controlling unit 33. When the determined inflation pressure of any of the five tires is below a predetermined threshold Th, the controlling unit 33 outputs to the warning device 4 a warning signal indicative of both the inflation pressure and location of the flattened tire.

The warning device 4 is, as illustrated in FIG. 1, electrically connected to the receiver 3 and located in a place visible for the driver of the vehicle 1. The warning device 4 is configured with, for example, a warning display on the instrument panel of the vehicle 1. The warning device 4 informs, in response to receipt of the warning signal from the receiver 3, the driver of the inflation pressure and location of the flattened tire.

The first triggering device 5a transmits, in response to receipt of the first command signal from the controlling unit 33 of the receiver 3, the first trigger signal at a predetermined strength and a low frequency of, for example, 125-135 kHz. Similarly, the second triggering device 5b transmits, in response to receipt of the second command signal from the controlling unit 33 of the receiver 3, the second trigger signal at the predetermined strength and the low frequency.

Figure 4A:
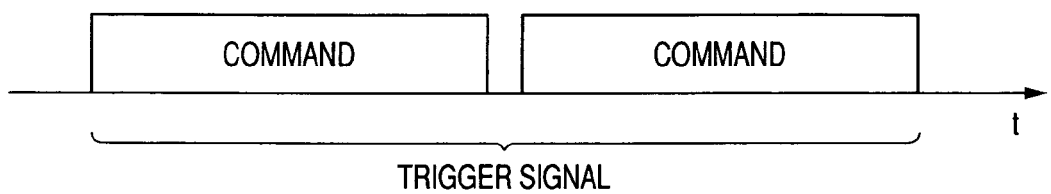
FIGS. 4A-4C are schematic views illustrating different forms which a trigger signal may have.
Figure 4B:
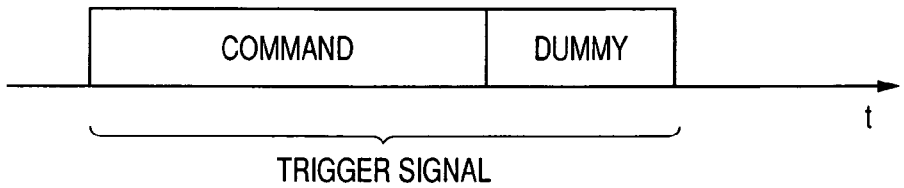
Figure 4C:
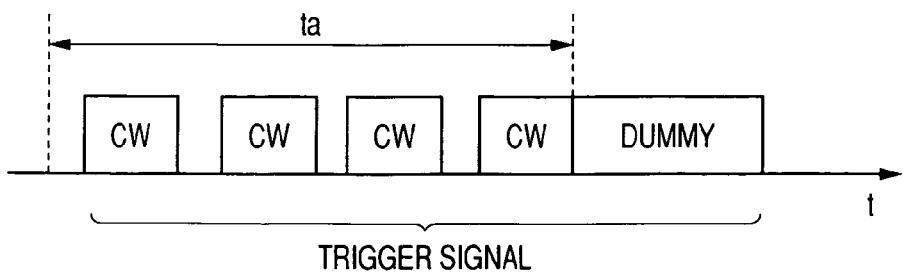

The first and second trigger signals may have, for example, any of three forms illustrated in FIGS. 4A-4C.

In FIG. 4A, the trigger signal (i.e., either of the first and second trigger signals) is formed of two command frames that are to be successively transmitted. Each of the command frames contains an activation command and an execution command. The activation command is a command for switching the controlling unit 22 of a corresponding transceiver (i.e., one of the transceivers 2a-2e) from the sleep mode to the wake-up mode. The execution command is a command for the activated controlling unit 22 to execute the above-described processes including: 1) monitoring the strength of the received trigger signal for the given length of time; 2) determining the mean value of the monitored strength and the amplitude of variation in the monitored strength; 3) assembling a frame that contains both the mean strength information and strength variation amplitude information respectively indicative of the determined mean value and amplitude; and 3) controlling the transmitting unit 23 to transmit the assembled frame.

With the above formation, the controlling unit 22 of the corresponding transceiver can be activated upon receipt of the first command frame, and can monitor the strength of the second command frame thereat and determine the amplitude of variation in the monitored strength of the second frame.

In addition, the trigger signal may also be formed of more than two command frames. Moreover, the command frames of the trigger signal may be transmitted either consecutively or with time intervals therebetween.

In FIG. 4B, the trigger signal is formed of a command frame and a dummy frame that are to be consecutively transmitted. The command frame contains the same activation and execution commands as the command frames in FIG. 4A, whereas the dummy frame contains no command.

With the above formation, the controlling unit 22 of a corresponding transceiver can be activated upon receipt of the command frame, and can monitor the strength of the dummy frame thereat and determine the amplitude of variation in the monitored strength of the du my frame.

In addition, the dummy frame may be made up of either a modulated signal or a non-modulated carrier signal.

In FIG. 4C, the trigger signal is formed of a pulse train and a dummy frame. The pulse train includes a plurality of pulses CW, which are to be transmitted for a given length of time ta, and has the same function as the command frames in FIGS. 4A and 4B. The dummy frame is the same as that in FIG. 4B.

With the above formation, the controlling unit 22 of a corresponding transceiver can be activated upon receipt of the pulse train, and can monitor the strength of the dummy frame thereat and determine the amplitude of variation in the monitored strength of the dummy frame.

In addition, the pulses CW may be made up of either amplitude-modulated signals or non-modulated signals.

Moreover, in addition to the above three forms, the first and second trigger signals may also have other forms. For example, though each of the command frames in FIG. 4A includes both the activation and execution commands, it is also possible to make the first command frame contain only the activation command and the second command frame contain only the execution command. In this case, it is possible to transmit the two command frames at different strengths. Furthermore, in the case of the transceivers 2a-2e being always in the wake-up mode, it is also possible to remove the activation command from each of the command frames in FIGS. 4A and 4B.

In the present embodiment, the first and second triggering devices 5a and 5b are each made up of a LF (Low Frequency) magnetic field antenna that is shaped in a coil.

The first triggering device 5a is located closer to the front wheels 6a and 6b than the rear wheels 6c and 6d, so as to allow only the transceivers 2a and 2b on the front wheels 6a and 6b to receive the first trigger signal. Moreover, the first triggering device 5a is offset from the longitudinal centerline C-C of the vehicle 1, so as to make the strengths of the first trigger signal at the transceivers 2a and 2b different from each other. On the other hand, the second triggering device 5b is located closer to the rear wheels 6c and 6d than the front wheels 6a and 6b, so as to allow only the transceivers 2c and 2d on the rear wheels 6c and 6d to receive the second trigger signal. Moreover, the second triggering device 5b is also offset from the longitudinal centerline C-C of the vehicle 1, so as to make the strengths of the second trigger signal at the transceivers 2c and 2d different from each other.

In the present embodiment, the first triggering device 5a is located in close vicinity to the FL wheel 6b, while the second triggering device 5b is located in close vicinity to the RL wheel 6d. Consequently, the strength of the first trigger signal is higher at the transceiver 2b than at the transceiver 2a, and the strength of the second trigger signal is higher at the transceiver 2d than at the transceiver 2c.

Further, with the above locations of the first and second triggering devices 5a and 5b, the second trigger signal transmitted by the second triggering device 5b also can be received by the transceiver 2e on the spare wheel 5e.

Additionally, it is preferable for the first and second triggering devices 5a and 5b to be located in places where no metal members completely surround the devices 5a and 5b and it is possible to protect the devices 5a and 5b from foreign matter, such as water and stones. Accordingly, in the present embodiment, the first triggering device 5a is located within the well of the FL wheel 6b, and the second triggering device 5b is located within the well of the RL wheel 6d.

After having described the overall configuration of the tire inflation pressure detecting apparatus S1, operation thereof will be described hereinafter.

According to the present embodiment, the tire inflation pressure detecting apparatus S1 has two different operation modes. The first mode is "ID registration mode" and the second one is "periodic transmission mode". The tire inflation pressure detecting apparatus S1 is configured to operate in the ID registration mode first and then in the periodic transmission mode.

Specifically, after a predetermined time from the turning of an ignition switch (not shown) of the vehicle 1 from off to on, the tire inflation pressure detecting apparatus S1 starts to operate in the ID registration mode.

Figure 5:
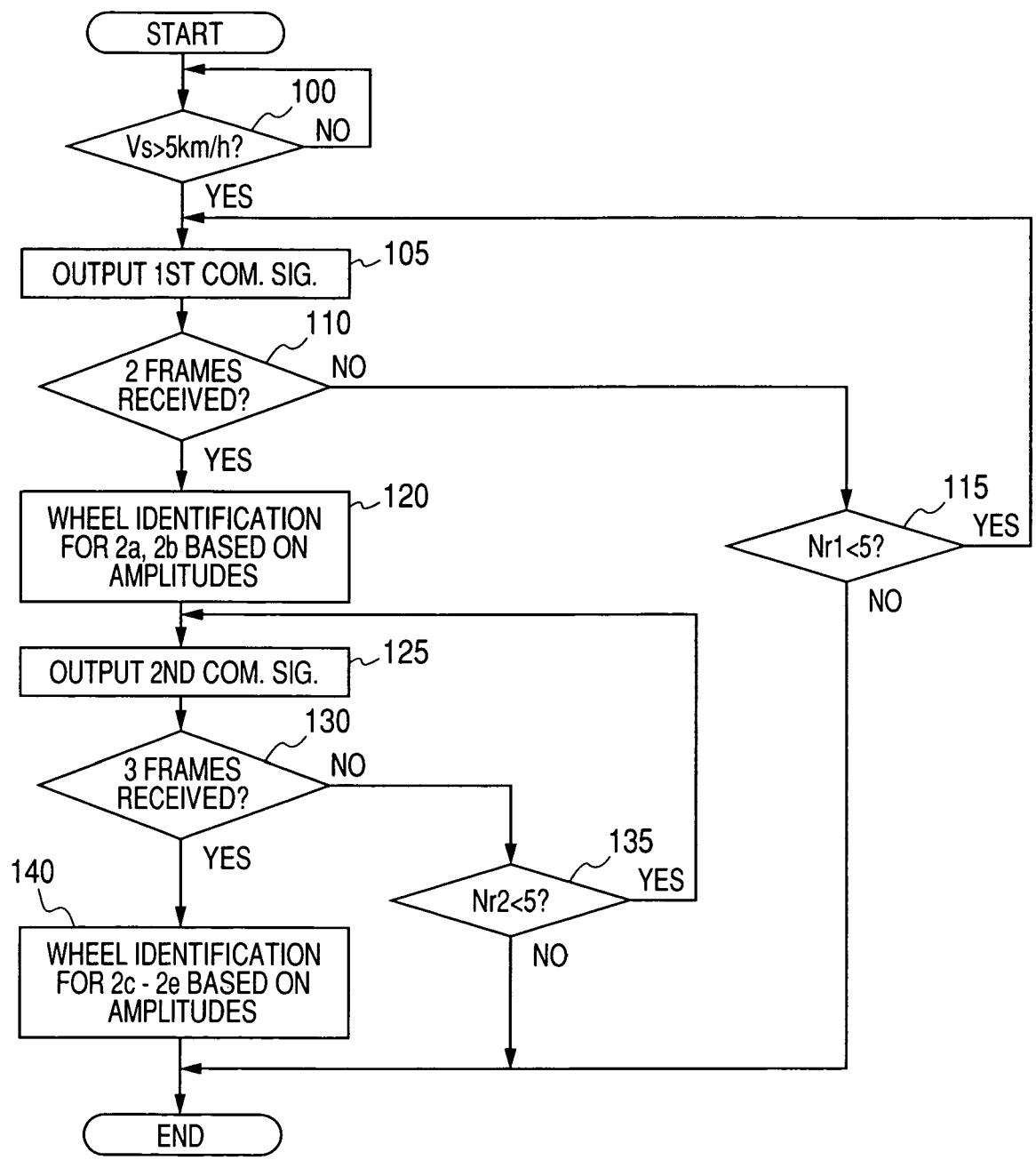
FIG. 5 is a flow chart illustrating a process of the receiver in an "ID registration mode" of the tire inflation pressure detecting apparatus.

FIG. 5 shows a process of the controlling unit 33 of the receiver 3 in the ID registration mode.

First, at step 100, the controlling unit 33 determines whether the running speed Vs of the vehicle 1 is higher than 5 km/h.

If the determination at step 100 produces a "NO" answer, then the controlling unit 33 waits for the running speed Vs to increase above 5 km/h.

On the contrary, if the determination at step 100 produces a "YES" answer, then the process proceeds to step 105.

At step 105, the controlling unit 33 outputs the first command signal to the triggering device 5a.

In response to receipt of the first command signal, the triggering device 5a continuously transmits the first trigger signal at the predetermined strength for a predetermined time period to the transceivers 2a and 2b on the front wheels 6a and 6b.

Each of the transceivers 2a and 2b performs a process shown in FIG. 6, the details of which are to be described later. By performing the process, the transceivers 2a and 2b transmit the respective frames to the receiver 3 in response to receipt of the first trigger signal.

At step 110 of FIG. 5, the controlling unit 33 of the receiver 3 determines whether two frames have been received thereby for a predetermined time period after outputting the first command signal.

Normally, both the transceivers 2a and 2b on the front wheels 6a and 6b can receive the first trigger signal, and thus can transmit the respective frames in response to receipt of the first trigger signal. However, when the vehicle 1 is parked in an area where there are jamming radio waves transmitted by other devices or facilities, either or both of the transceivers 2a and 2b may not receive the first trigger signal; thus, the number of frames transmitted by the transceivers 2a and 2b in response to receipt of the first trigger signal may be less than two.

If the determination at step 110 produces a "NO" answer, then a counter Nr1 of the controlling unit 33 is increased by one, and the process proceeds to step 115.

Here, the counter Nr1 represents the number of retransmissions of the first command signal by the controlling unit 33, and is initially set to zero.

At step 115, the controlling unit 33 determines whether the counter Nr1 is less than 5.

If the determination at step 115 produces a "YES" answer, then the process returns to step 105 to retransmit the first command signal. On the contrary, if the determination at step 115 produces a "NO" answer, then the process directly goes to the end. In addition, in the latter case, at least one of the transceivers 2a and 2b may be in a fault condition (e.g., exhaustion of the battery 24), and it is preferable for the controlling unit 33 to warn the driver of the fault condition via the warning device 4.

On the other hand, if the determination at step 110 produces a "YES" answer, then the process proceeds to step 120.

At step 120, the controlling unit 33 identifies, for each of the two received frames, the wheel on which the transceiver (i.e., one of the transceivers 2a and 2b) having transmitted the frame is mounted. In other words, the controlling unit 33 makes wheel identification for the transceivers 2a and 2b.

The basic principle of the wheel identification for the transceivers 2a and 2b is as follows. First, referring to FIG. 7, the strength of the first trigger signal (or the second trigger signal) attenuates with increase in the distance from the first triggering device 5a (or the second triggering device 5b). Further, the transceiver 2b moves with rotation of the FL wheel 6b in a range as shown in FIG. 8A. Since the distance from the first triggering device 5a to the FL wheel 6b is short, the ratio of the variation in the distance between the first triggering device 5a and the transceiver 2b to the distance from the first triggering device 5a to the FL wheel 6b is large. Consequently, as shown in FIG. 8A, the strength of the first trigger signal at the transceiver 2b varies greatly, resulting in a large amplitude of variation in the strength of the first trigger signal at the transceiver 2b. Moreover, the transceiver 2a moves with rotation of the FR wheel 6a in a range as shown in FIG. 8B. Since the distance from the first triggering device 5a to the FR wheel 6a is long, the ratio of the variation in the distance between the first triggering signal 5a and the transceiver 2a to the distance from the first triggering device 5a to the FR wheel 6a is small. Consequently, as shown in FIG. 8B, the strength of the first trigger signal at the transceiver 2a varies slightly, resulting in a small amplitude of variation in the strength of the first trigger signal at the transceiver 2a.

Accordingly, in the present embodiment, the controlling unit 33 first retrieves all the ID information and strength variation amplitude information from the two received frames. Then, the controlling unit 33 identifies that one of the two frames which contains the strength variation amplitude information indicating the larger amplitude of variation in the strength of the first trigger signal as being transmitted by the transceiver 2b on the FL wheel 6b, and the other as being transmitted by the transceiver 2a on the FR wheel 6a.

After the wheel identification, the controlling unit 33 registers in the RAM thereof the ID information contained in each of the two frames as the reference ID information of that one of the two transceivers 2a and 2b which has transmitted the frame.

At step 125 of FIG. 5, the controlling unit 33 outputs the second command signal to the triggering device 5b.

In response to receipt of the second command signal, the triggering device 5b continuously transmits the second trigger signal at the predetermined strength for a predetermined time period to the transceivers 2c-2e on the rear and spare wheels 6c-6e.

Figure 6:
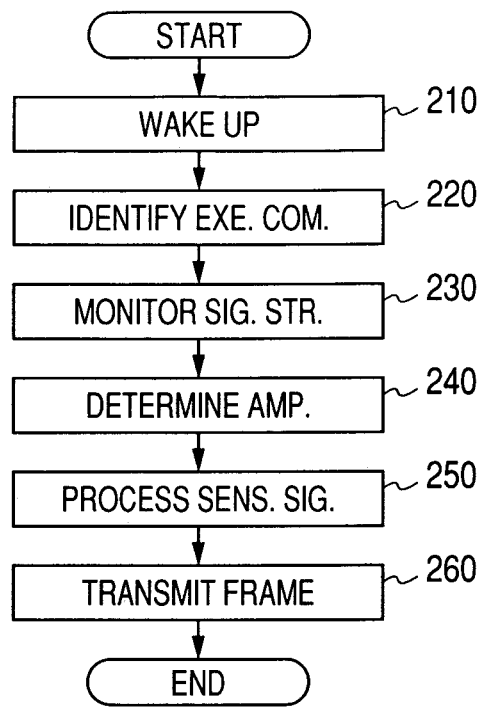
FIG. 6 is a flow chart illustrating a process of each of the transceivers in the ID registration mode.
Figure 7:
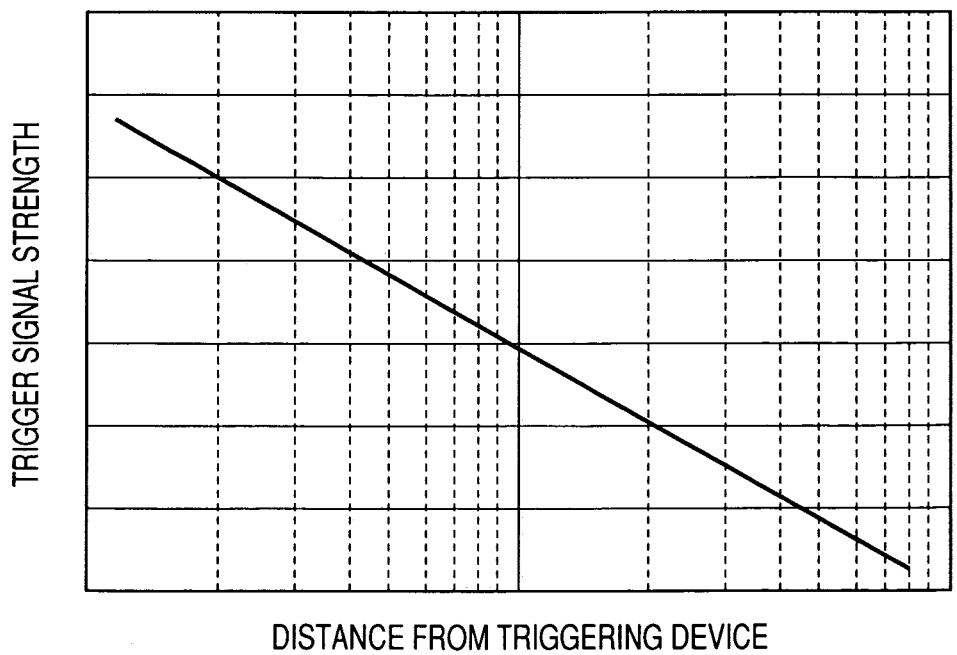
FIG. 7 is a graphical representation showing the relationship between the strength of a trigger signal and the distance from a triggering device that transmits the trigger signal.

Each of the transceivers 2c-2e also performs the process shown in FIG. 6. By performing the process, the transceivers 2c-2e transmit the respective frames to the receiver 3 in response to receipt of the second trigger signal.

At step 130, the controlling unit 33 of the receiver 3 determines whether three frames have been received thereby for a predetermined time period after outputting the second command signal.

If the determination at step 130 produces a "NO" answer, then a counter Nr2 of the controlling unit 33 is increased by one, and the process proceeds to step 135.

Here, the counter Nr2 represents the number of retransmissions of the second command signal by the controlling unit 33, and is initially set to zero.

At step 135, the controlling unit 33 determines whether the counter Nr2 is less than 5.

If the determination at step 135 produces a "YES" answer, then the process returns to step 125 to retransmit the second command signal. On the contrary, if the determination at step 135 produces a "NO" answer, then the process directly goes to the end.

On the other hand, if the determination at step 130 produces a "YES" answer, then the process proceeds to step 140.

At step 140, the controlling unit 33 identifies, for each of the three received frames, the wheel on which the transceiver (i.e., one of the transceivers 2c-2e) having transmitted the frame is mounted. In other words, the controlling unit 33 makes wheel identification for the transceivers 2c-2e.

The basic principle of the wheel identification for the transceivers 2c-2e is as follows. First, the transceiver 2d moves with rotation of the RL wheel 6d in a range as shown in FIG. 9A. Since the distance from the second triggering device 5b to the RL wheel 6d is short, the ratio of the variation in the distance between the second triggering signal 5b and the transceiver 2d to the distance from the second triggering device 5b to the RL wheel 6d is large. Consequently, as shown in FIG. 9A, the strength of the second trigger signal at the transceiver 2d varies greatly, resulting in a large amplitude of variation in the strength of the second trigger signal at the transceiver 2d. Further, the transceiver 2c moves with rotation of the RR wheel 6c in a range as shown in FIG. 9B. Since the distance from the second triggering device 5b to the RR wheel 6c is long, the ratio of the variation in the distance between the second triggering signal 5b and the transceiver 2c to the distance from the second triggering device 5b to the RR wheel 6c is small. Consequently, as shown in FIG. 9B, the strength of the second trigger signal at the transceiver 2c varies slightly, resulting in a small amplitude of variation in the strength of the second trigger signal at the transceiver 2c. Moreover, as shown in FIG. 9C, the distance between the triggering device 5b and the transceiver 2e on the spare wheel 6e keeps constant during running of the vehicle 1. Consequently, the variation in the strength of the second trigger signal at the transceiver 2e on the spare wheel 6e is substantially zero.

Accordingly, in the present embodiment, the controlling unit 33 first retrieves all the ID information and strength variation amplitude information from the three received frames. Then, the controlling unit 33 identifies that one of the three frames which contains the strength variation amplitude information indicating the smallest amplitude of variation in the strength of the second trigger signal as being transmitted by the transceiver 2e on the spare wheel 6e, that one of the three frames which contains the strength variation amplitude information indicating the largest amplitude as being transmitted by the transceiver 2d on the RL wheel 6d, and the remaining one as being transmitted by the transceiver 2c on the RR wheel 6c.

After the wheel identification, the controlling unit 33 registers in the RAM thereof the ID information contained in each of the three received frames as the reference ID information of that one of the three transceivers 2c-2e which has transmitted the frame.

Referring back to FIG. 6, there is shown the process which the controlling unit 22 of each of the transceivers 2a-2e performs in the ID registration mode.

First, at step 210, the controlling unit 22 is switched from the sleep mode to the wake-up mode upon receiving the first or second trigger signal via the receiving antenna 27 and the receiving unit 25.

At step 220, the controlling unit 22 identifies the execution command contained in the received first or second trigger signal.

At step 230, the controlling unit 22 monitors the strength of the received first or second trigger signal for the given length of time, and determines the mean value of the monitored strength for the given length of time.

At step 240, the controlling unit 22 determines the amplitude of variation in the monitored strength of the first or second trigger signal for the given length of time. As described above, the given length of time is so set as to allow the associated wheel to make more than one revolution for it with the running speed Vs of the vehicle 1 being, for example, 5 km/h.

At step 250, the controlling unit 22 receives and processes sensing signals output from the sensing unit 21.

At step 260, the controlling unit 22 assembles the frame, which contains the ID information, mean strength information, strength variation amplitude information, tire pressure information, and tire temperature information, and controls the transmitting unit 23 to transmit the frame to the receiver 3 via the transmitting antenna 26.

As above, the wheel identification and ID registration are made for all of the transceivers 2a-2e on the running and spare wheels 6a-6e. Then, the operation of the tire inflation pressure detecting apparatus S1 is shifted from the ID registration mode to the periodic transmission mode.

In the periodic transmission mode, the controlling unit 22 of each of the transceivers 2a-2e periodically performs the processes including: 1) receiving and processing the signals output from the sensing unit 21; 2) assembling a frame that contains the ID information indicative of the identity of the each of the transceivers 2a-2e, the tire pressure information indicative of the inflation pressure of the associated tire sensed by the sensing unit 21, and the tire temperature information indicative of the internal temperature of the associated tire sensed by the sensing unit 21; and 3) transmitting the frame to the receiver 3 via the transmitting unit 23 and the transmitting antenna 26.

On the other hand, the controlling unit 33 of the receiver 3 receives all the frames transmitted by the transceivers 2a-2e via the receiving antenna 31 and the receiving unit 32. Then, the controlling unit 33 identifies, for each of the received frames, the wheel on which the transceiver (i.e., one of the transceivers 2a-2e) having transmitted the frame is mounted by matching the ID information contained in the frame with a coincident one of all the reference ID information registered in the RAM. Further, the controlling unit 33 determines, for each of the received frames, the inflation pressure of the associated tire based on the tire pressure information contained in the frame. Moreover, the controlling unit 33 performs, when necessary, a temperature compensation for the determined inflation pressures based on the tire temperature information contained in the received frames.

In addition, for each of the transceivers 2a-2e, the time intervals for the periodic sensing and transmitting operation may be either fixed or varied according to a variation in the inflation pressure of the associated tire. For example, when the difference between two successively determined values of the inflation pressure of the associated tire is above a reference value, the time intervals may be set to, for example, 5 sec; otherwise, the same may be set to, for example, 1 min.

As above, both the inflation pressure and location of each of the tires are determined by the controlling unit 33. When the determined inflation pressure of any of the tires is decreased below the predetermined threshold Th, the controlling unit 33 informs, via the warning device 4, the driver of both the inflation pressure and location of the flattened tire.

When the ignition switch of the vehicle 1 is turned from on to off, the controlling unit 33 of the receivers 3 transmits a stop command signal to the triggering devices 5a and 5b, thereby causing them to transmit a stop trigger signal. Upon receiving the stop trigger signal via the receiving antenna 27 and the receiving unit 25, the controlling unit 22 of each of the transceivers 2a-2e is switched from the wake-up mode to the sleep mode, thus completing the entire operation of the tire inflation pressure detecting apparatus S1.

With the above-described configuration of the tire inflation pressure detecting apparatus S1, the receiver 3 can automatically and accurately identify, for each of the transceivers 2a-2e, that one of the running and spare wheels 6a-6e on which it is mounted.

Accordingly, with the above configuration, the tire inflation pressure detecting apparatus S1 can automatically and reliably carry out the ID registration without performing the conventional time-consuming manual operation.

Moreover, the receiver 3 can accurately distinguish the transceiver 2e on the spare wheel 6e from the transceivers 2a-2d on the running wheels 6a-6d at a considerably lower running speed of the vehicle 1 than the system disclosed in Japanese Patent No. 3815305.

In addition, it is possible for all the transceivers 2a-2e to have the same configuration and for the receiver 3 to include only the single receiving antenna 31, thus reducing the manufacturing cost of the tire inflation pressure detecting apparatus S1.

Second Embodiment

This embodiment illustrates a wheel identification method which is different from the wheel identification method according to the previous embodiment.

In the previous embodiment, the receiver 3 outputs the first and second command signals to the first and second triggering devices 5a and 5b only when the running speed Vs of the vehicle 1 exceeds a predetermined value (e.g., 5 km/h). In other words, the wheel identification for the transceivers 2a-2e is made only when the vehicle 1 is running at a higher speed than the predetermined value. Moreover, each of the transceivers 2a-2e monitors the strength of the first or second trigger signal thereat for the given length of time, and determines the amplitude of variation in the monitored strength of the first or second trigger signal for the given length of time as a physical quantity representing the variation in the strength of the first or second trigger signal thereat.

In comparison, in the present embodiment, the receiver 3 sets a monitoring time T according to the running speed Vs of the vehicle 1. Each of the transceivers 2a-2e monitors the strength of the first or second trigger signal thereat for the monitoring time T set by the receiver 3. Each of the transceivers 2a-2e further determines the difference between the maximum and minimum values of the monitored strength of the first or second trigger signal for the monitoring time T as a physical quantity representing the variation in the strength of the first or second trigger signal thereat.

Figure 10:
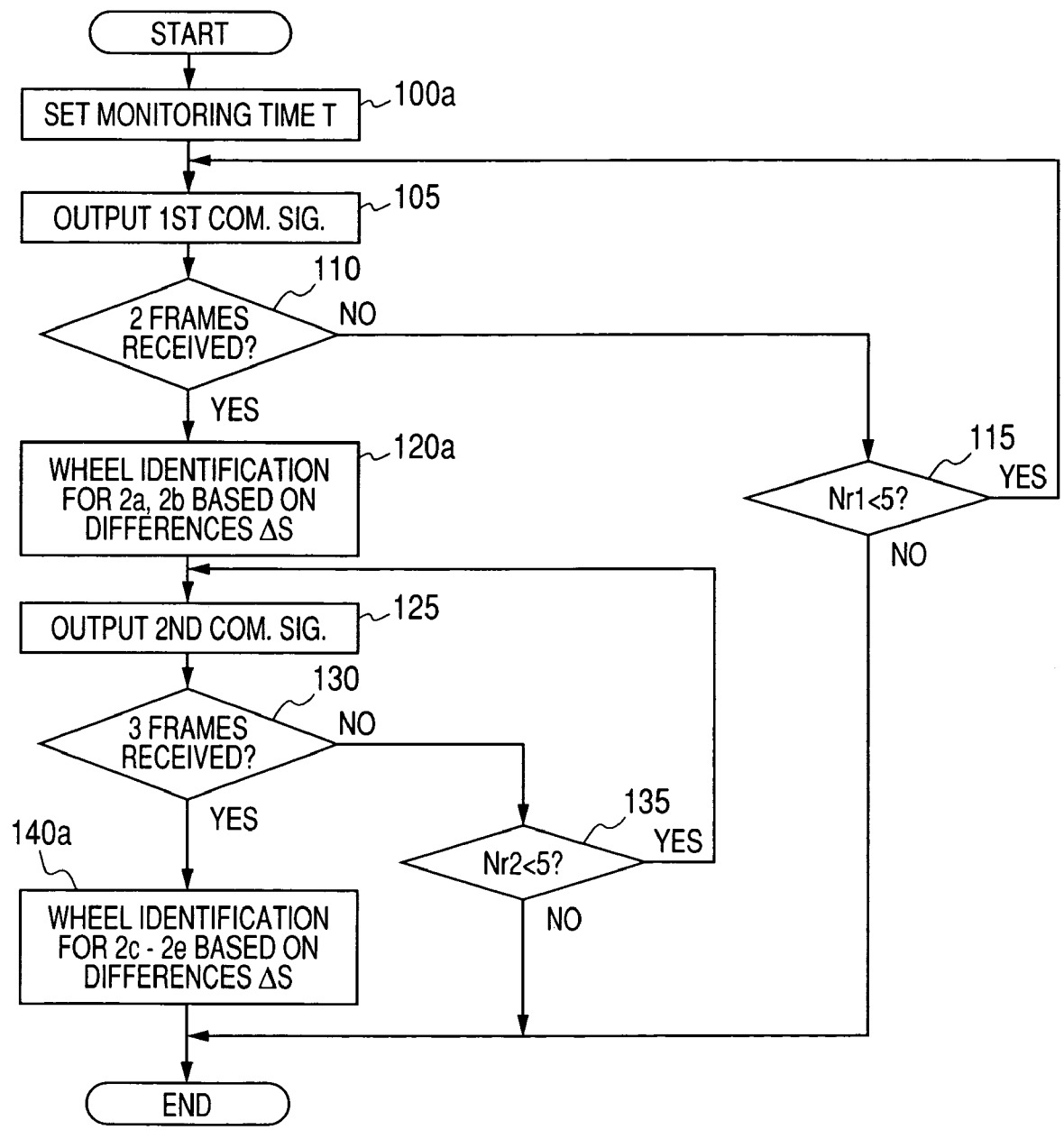
FIG. 10 is a flow chart illustrating a process of the receiver in the ID registration mode according to the second embodiment of the invention.

FIG. 10 shows a process of the controlling unit 33 of the receiver 3 according to the present embodiment. This process is similar to the process shown in FIG. 5 and described in the previous embodiment; therefore, only the differences between the two processes will be described hereinafter.

First, at step 100a of FIG. 10, the controlling unit 33 of the receiver 3 sets the monitoring time T according to the running speed Vs of the vehicle 1.

Figure 11:
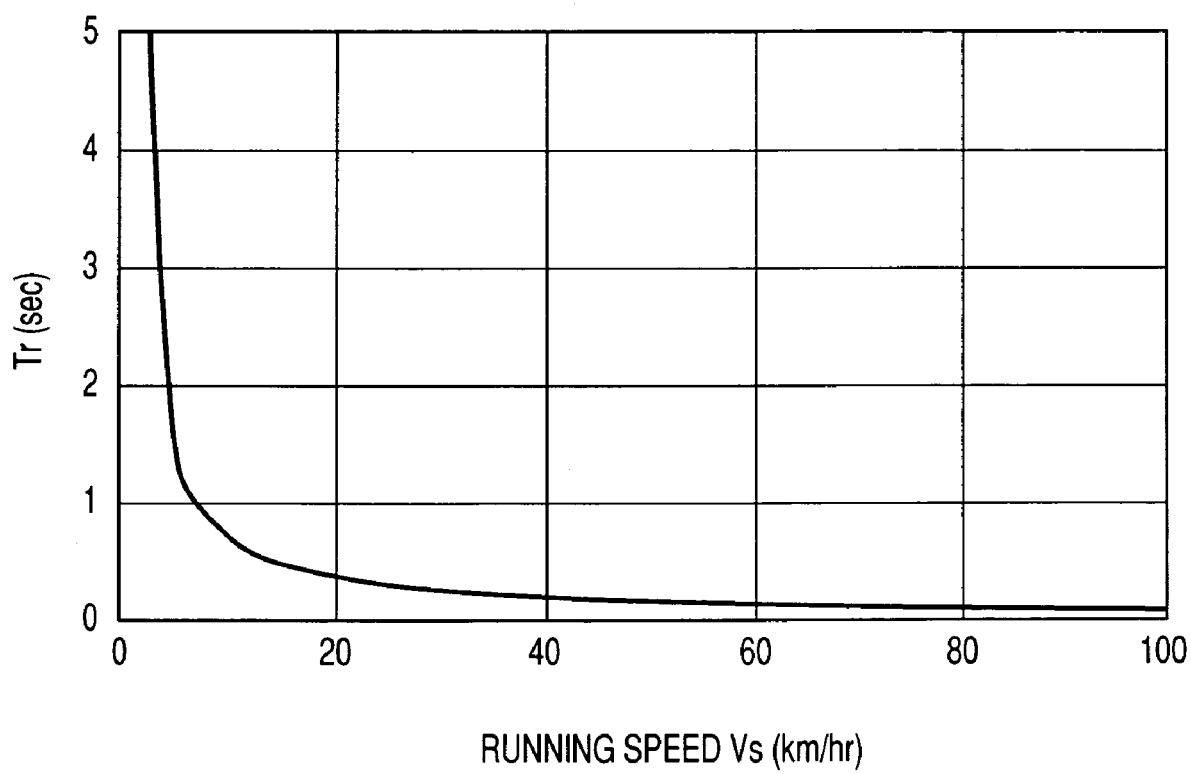
FIG. 11 is a graphical representation showing the relationship between the running speed of the vehicle and the rotation time required for a running wheel of the vehicle to make one revolution.

As is generally known, the amplitude of variation in the monitored strength of the first or second trigger signal at the transceiver (i.e., each of the transceivers 2a-2e) represents the distance from the mean position to an extreme position in the waveform of the monitored strength. Therefore, to determine the amplitude, it is necessary to monitor the strength for a sufficiently long time during which the associated wheel can make more than one revolution. FIG. 11 shows the relationship between the running speed Vs of the vehicle 1 and the rotation time Tr required each of the running wheels 6a-6d to make one revolution. As shown, as the running speed Vs decreases, the rotation time Tr increases, resulting in an increased consumption of the battery 24.

Accordingly, to save the battery 24, in the present embodiment, the controlling unit 33 sets the monitoring time T by the following steps: 1) determining the rotation time Tr based on the running speed Vs of the vehicle 1; 2) comparing the determined rotation time Tr with a predetermined threshold Tu; and 3) setting the monitoring time T to Tr if Tr≦Tu, and to Tu if Tr>Tu.

At step 105 of FIG. 10, the controlling unit 33 outputs to the triggering device 5a the first command signal which contains time information indicative of the monitoring time T set at step 100a.

In response to receipt of the first command signal, the triggering device 5a continuously transmits for a predetermined time period to the transceivers 2a and 2b the first trigger signal which also contains the time information indicative of the monitoring time T. Further, in response to receipt of the first trigger signal, each of the transceivers 2a and 2b performs processes including: 1) determining the monitoring time T based on the time information contained in the first trigger signal; 2) monitoring the strength of the first trigger signal thereat for the monitoring time T; 3) determining the difference ΔS between the maximum and minimum values of the monitored strength for the monitoring time T; and 4) transmitting to the receiver 3 a frame that contains, instead of the strength variation amplitude information, strength difference information indicative of the determined difference ΔS.

When the monitoring time T is so short that the associated wheel cannot make one revolution during T, it may be impossible to determine, for each of the transceivers 2a and 2b, the amplitude of variation in the strength of the first trigger signal thereat. However, even in such a case, it is still possible to determine the difference ΔS for each of the transceivers 2a and 2b. Moreover, with the first triggering device 5a being located closer to the FL wheel 6b than the FR wheel 6a, the difference ΔS for the transceiver 2b is greater than that for the transceiver 2a.

Consequently, at step 120a, the controlling unit 33 can accurately identify, for each of the two received frames, the wheel on which the transceiver (i.e., one of the transceivers 2a and 2b) having transmitted the frame is mounted through a comparison between the differences ΔS indicated by the strength difference information contained in the two frames. In other words, the controlling unit 33 can accurately perform wheel identification for the transceivers 2a and 2b.

Similarly, at step 125, the controlling unit 33 outputs to the triggering device 5b the second command signal which contains the time information indicative of the monitoring time T set at step 100a.

In response to receipt of the second command signal, the triggering device 5b continuously transmits for a predetermined time period to the transceivers 2c-2e the second trigger signal which also contains the time information indicative of the monitoring time T. Further, in response to receipt of the second trigger signal, each of the transceivers 2c-2e performs processes including: 1) determining the monitoring time T based on the time information contained in the second trigger signal; 2) monitoring the strength of the second trigger signal thereat for the monitoring time T; 3) determining the difference ΔS between the maximum and minimum values of the monitored strength for the monitoring time T; and 4) transmitting to the receiver 3 a frame that contains, instead of the strength variation amplitude information, strength difference information indicative of the determined difference ΔS.

With the second triggering device 5b being located closer to the RL wheel 6d than the RR wheel 6c, the difference ΔS for the transceiver 2d is greater than that for the transceiver 2c. Moreover, the difference ΔS for the transceiver 2e on the spare wheel 6e is substantially zero.

Consequently, at step 140a, the controlling unit 33 can accurately identify, for each of the three received frames, the wheel on which the transceiver (i.e., one of the transceivers 2c-2e) having transmitted the frame is mounted through a comparison between the differences ΔS indicated by the strength difference information contained in the three frames. In other words, the controlling unit 33 can accurately perform wheel identification for the transceivers 2c-2e.

As to the other steps 110, 115, 130, and 135, since they are the same as those in FIG. 5, a repeated description thereof is omitted here.

With the above-described wheel identification method according to the present embodiment, it is also possible to achieve the advantages of the tire inflation pressure detecting apparatus S1 described in the previous embodiment.

In addition, with the wheel identification method according to the present embodiment, it is possible to prolong the service life of the battery 24 of each of the transceivers 2a-2e.

Third Embodiment

This embodiment illustrates a tire inflation pressure detecting apparatus S3 which has almost the same configuration as the tire inflation pressure detecting apparatus S1 according to the first embodiment. Accordingly, only the differences between the two apparatuses S1 and S3 will be described hereinafter.

In the tire pressure detecting apparatus S1, as described previously, there are provided only the two triggering devices 5a and 5b. The first triggering device 5a is located in close vicinity to the FL wheel 6b to transmit the first trigger signal only to the transceivers 2a and 2b on the front wheels 6a and 6b. The second triggering device 5b is located in close vicinity to the RL wheel 6d to transmit the second trigger signal only to the transceivers 2c-2e on the rear and spare wheels 6c-6e.

Figure 12:
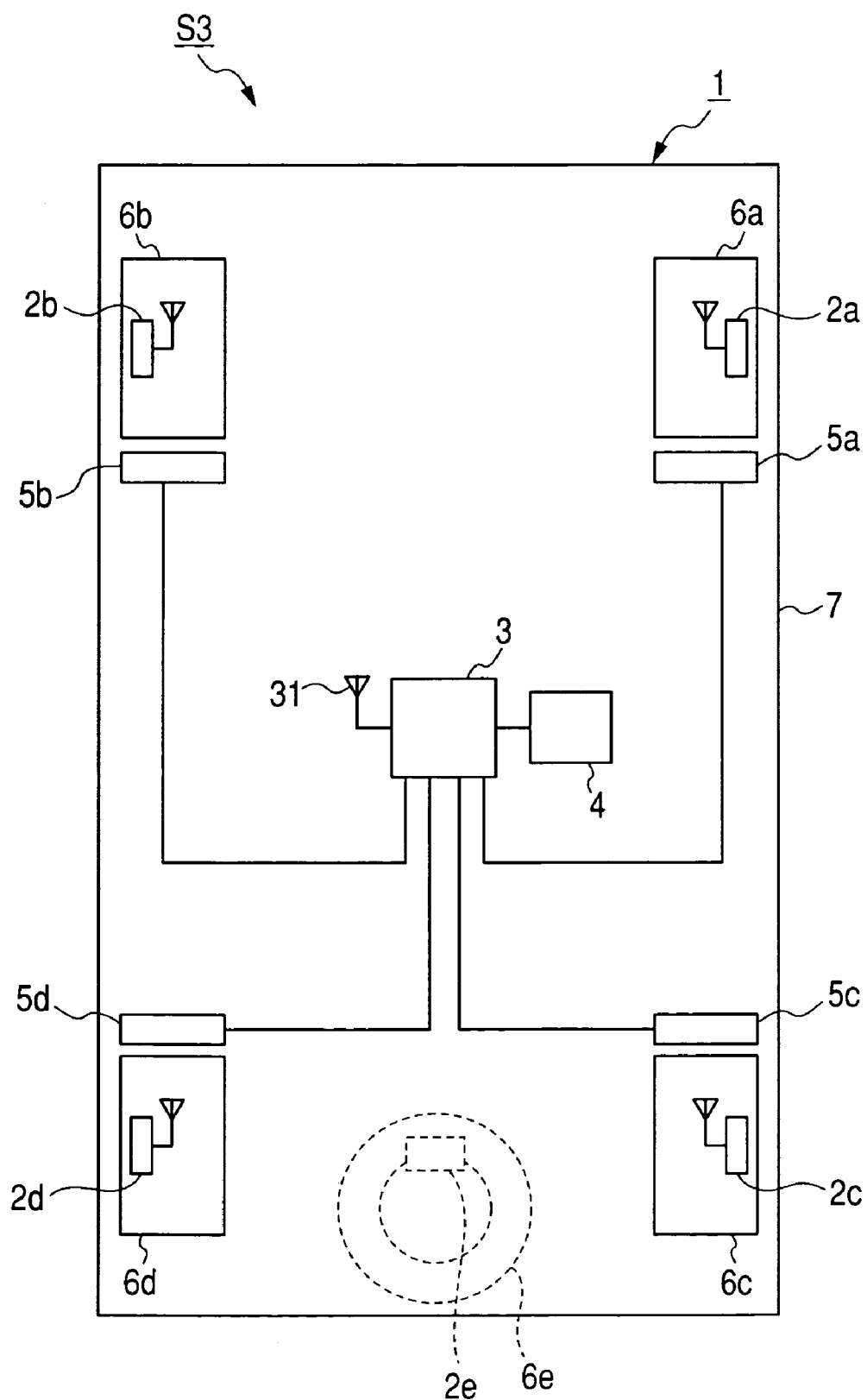
FIG. 12 is a schematic view showing the overall configuration of a tire inflation pressure detecting apparatus for a vehicle according to the third embodiment of the invention.

In comparison, in the tire inflation pressure detecting apparatus S3, there are provided four triggering devices 5a-5d, as shown in FIG. 12. The first triggering device 5a is located in close vicinity to the FR wheel 6a, so that only the transceiver 2a on the FR wheel 6a can receive a first trigger signal transmitted by the first triggering device 5a. The second triggering device 5b is located in close vicinity to the FL wheel 6b, so that only the transceiver 2b on the FL wheel 6b can receive a second trigger signal transmitted by the second triggering device 5b. The third triggering device 5c is located in close vicinity to the RR wheel 6c, so that only the transceivers 2c and 2e on the RR wheel 6c and spare wheel 6e can receive a third trigger signal transmitted by the third triggering device 5c. The fourth triggering device 5d is located in close vicinity to the RL wheel 6d, so that only the transceivers 2d and 2e on the RL wheel 6d and spare wheel 6e can receive a fourth trigger signal transmitted by the fourth triggering device 5d.

When the running speed Vs of the vehicle 1 exceeds a predetermined value (e.g., 5 km/h), the receiver 3 sequentially transmits first to fourth command signals respectively to the first to fourth triggering devices 5a-5d, thereby causing them to sequentially transmit the first to fourth trigger signals.

The first trigger signal transmitted by the first triggering device 5a only triggers the first transceiver 2a on the FR wheel 6a to transmit a frame. Accordingly, the receiver 3 determines a frame, which is transmitted to the receiver 3 as a result of the transmission of the first trigger signal, as being transmitted by the first transceiver 2a.

The second trigger signal transmitted by the second triggering device 5b only triggers the second transceiver 2b on the FL wheel 6b to transmit a frame. Accordingly, the receiver 3 determines a frame, which is transmitted to the receiver 3 as a result of the transmission of the second trigger signal, as being transmitted by the second transceiver 2b.

Figure 13A:
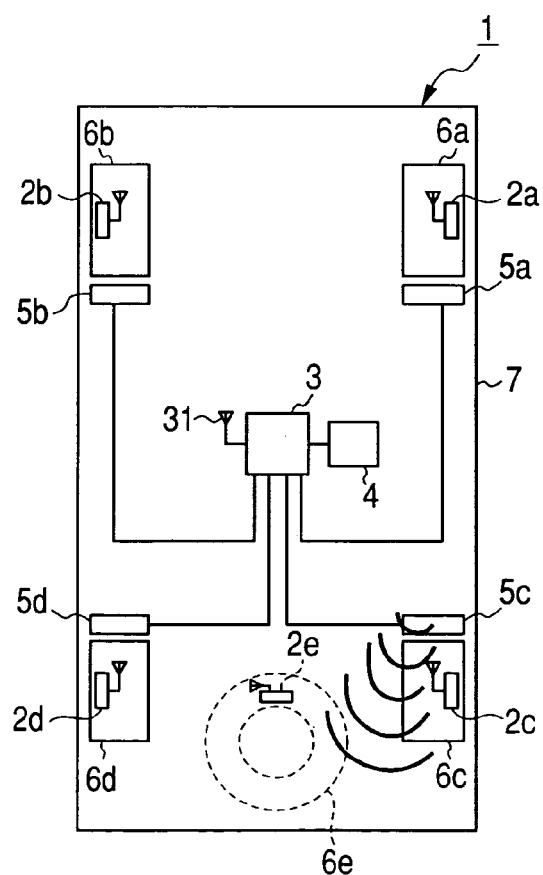
FIGS. 13A and 13B are schematic views illustrating the transmission of a trigger signal by a triggering device and the transmissions of frames by two transceivers in response to receipt of the trigger signal in the apparatus of FIG. 12.
Figure 13B:
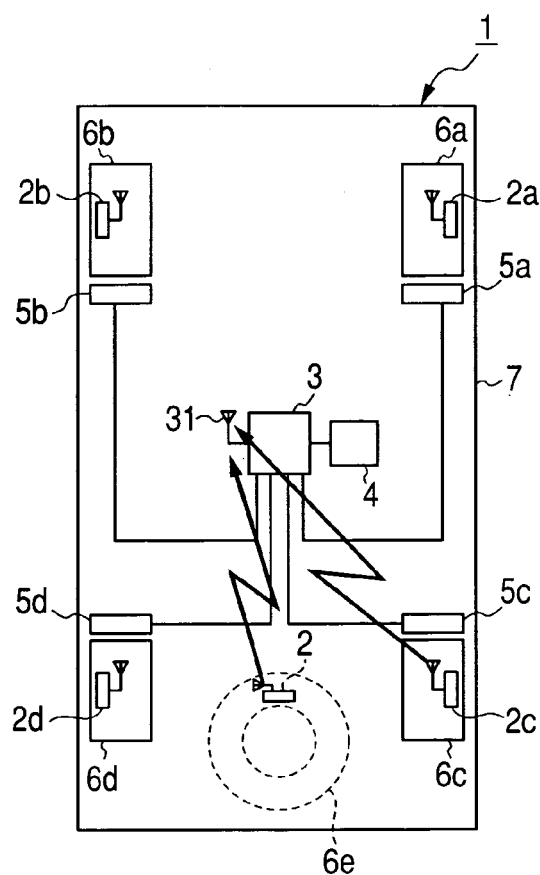

However, as illustrated in FIGS. 13A and 13B, the third trigger signal transmitted by the third triggering device 5c triggers each of the transceivers 2c and 2e on the RR and spare wheels 2c and 2e to transmit a frame. Consequently, the receiver 3 receives two frames that are transmitted to the receiver 3 as a result of the transmission of the third trigger signal. The receiver 3 then identifies that one of the two received frames which contains the strength variation amplitude information indicating the lager amplitude of variation in the strength of the third trigger signal as being transmitted by the transceiver 2c on the RR wheel 6c, and the other as being transmitted by the transceiver 2e on the spare wheel 6e.

Similarly, the fourth trigger signal transmitted by the fourth triggering device 5d triggers each of the transceivers 2d and 2e on the RL and spare wheels 6d and 6e to transmit a frame. Consequently, the receiver 3 receives two frames that are transmitted to the receiver 3 as a result of the transmission of the fourth trigger signal. The receiver 3 then identifies that one of the two received frames which contains the strength variation amplitude information indicating the lager amplitude of variation in the strength of the fourth trigger signal as being transmitted by the transceiver 2d on the RL wheel 6d, and the other as being transmitted by the transceiver 2e on the spare wheel 6e.

The above-described tire inflation pressure detecting apparatus S3 according to the present embodiment has the same advantages as the tire inflation pressure detecting apparatus S1 according to the first embodiment.

In addition, it is also possible to apply the wheel identification method of the second embodiment to the tire inflation pressure detecting apparatus S3.

Fourth Embodiment

Figure 14:
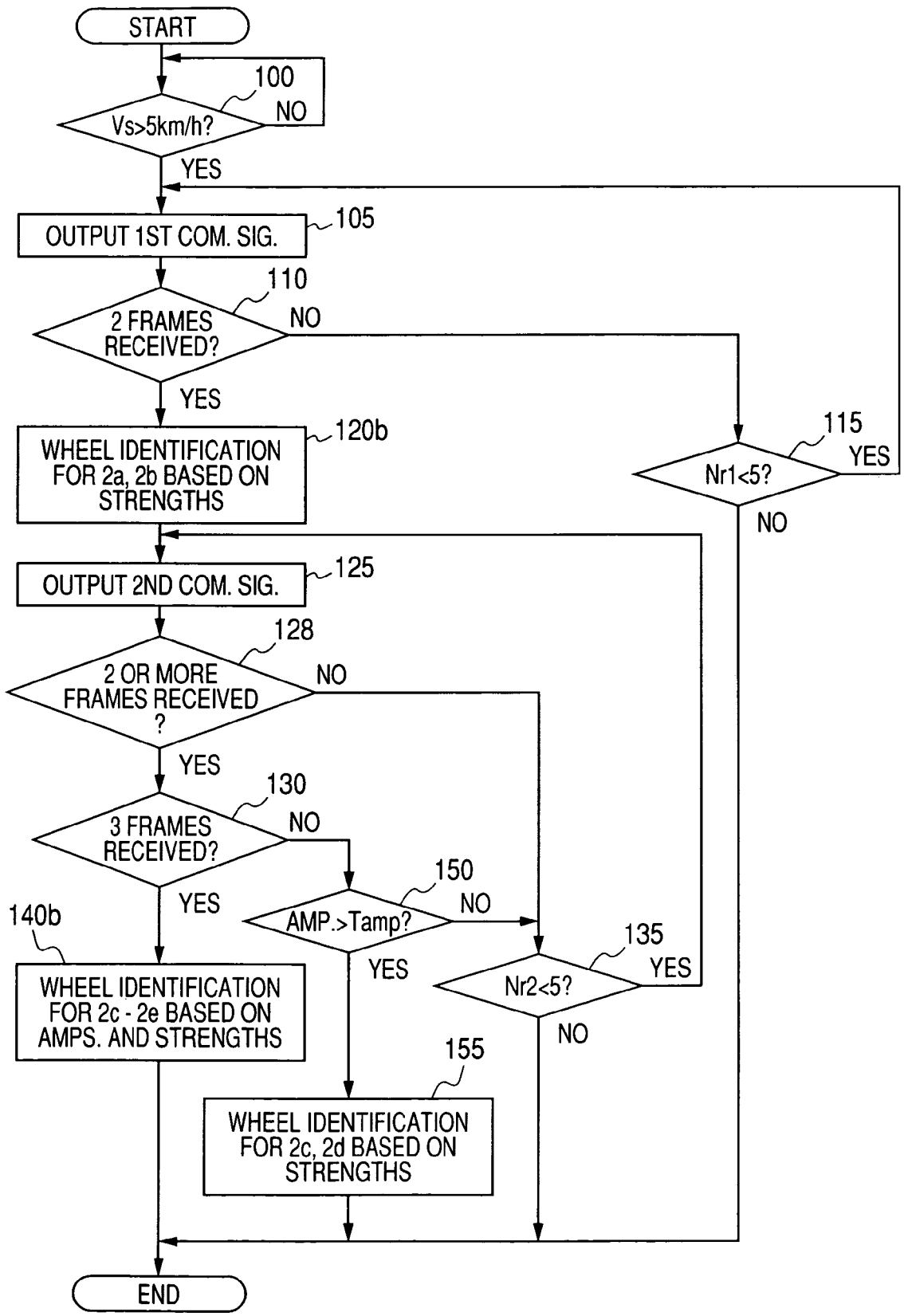
FIG. 14 is a flow chart illustrating a wheel identification process of the receiver according to the fourth embodiment of the invention.

FIG. 14 shows a wheel identification process of the controlling unit 33 of the receiver 3 according to the fourth embodiment of the invention. This process is a modification of the process shown in FIG. 5 and described in the first embodiment.

First, at step 100, the controlling unit 33 determines whether the running speed Vs of the vehicle 1 is higher than 5 km/h.

If the determination at step 100 produces a "NO" answer, then the controlling unit 33 waits for the running speed Vs to increase above 5 km/h.

On the contrary, if the determination at step 100 produces a "YES" answer, then the process proceeds to step 105.

At step 105, the controlling unit 33 outputs the first command signal to the triggering device 5a.

In response to receipt of the first command signal, the triggering device 5a continuously transmits the first trigger signal at the predetermined strength for a predetermined time period to the transceivers 2a and 2b on the front wheels 6a and 6b.

Further, in response to receipt of the first trigger signal, each of the transceivers 2a and 2b performs processes including: 1) monitoring the strength of the first trigger signal thereat for the given length of time; 2) determining the mean value of the monitored strength for the given length of time; 3) determining the amplitude of variation in the monitored strength for the given length of time; 4) transmitting to the receiver 3 the frame that contains the ID information indicative of the identity of the each of the transceivers 2a and 2b, the mean strength information indicative of the determined mean value of the strength, and the strength variation amplitude information indicative of the determined amplitude of variation in the strength.

At step 110, the controlling unit 33 determines whether two frames have been received thereby for a predetermined time period after outputting the first command signal.

If the determination at step 110 produces a "NO" answer, then the counter Nr1 is increased by one, and the process proceeds to step 115.

Here, as in the first embodiment, the counter Nr1 represents the number of retransmissions of the first command signal by the controlling unit 33, and is initially set to zero.

At step 115, the controlling unit 33 determines whether the counter Nr1 is less than 5.

If the determination at step 115 produces a "YES" answer, then the process returns to step 105 to retransmit the first command signal. On the contrary, if the determination at step 115 produces a "NO" answer, then the process directly goes to the end.

On the other hand, if the determination at step 110 produces a "YES" answer, then the process proceeds to step 120b.

At step 120b, the controlling unit 33 identifies, for each of the two received frames, the wheel on which the transceiver (i.e., one of the transceivers 2a and 2b) having transmitted the frame is mounted. In other words, the controlling unit 33 makes wheel identification for the transceivers 2a and 2b.

More specifically, in the present embodiment, the controlling unit 33 retrieves all the ID information and mean strength information from the two received frames. Then, the controlling unit 33 determines that one of the two frames which contains the mean strength information indicating the lager mean value of the strength of the first trigger signal as being transmitted by the transceiver 2b on the FL wheel 6b, and the other as being transmitted by the transceiver 2a on the FR wheel 6a.

After the wheel identification, the controlling unit 33 registers in the RAM thereof the ID information contained in each of the two frames as the reference ID information of that one of the two transceivers 2a and 2b which has transmitted the frame.

At step 125, the controlling unit 33 outputs the second command signal to the triggering device 5b.

In response to receipt of the second command signal, the triggering device 5b continuously transmits the second trigger signal at the predetermined strength for a predetermined time period to the transceivers 2c-2e on the rear and spare wheels 6c-6e. Further, in response to receipt of the second trigger signal, each of the transceivers 2c-2e performs processes including: 1) monitoring the strength of the second trigger signal thereat for the given length of time; 2) determining the mean value of the monitored strength for the given length of time; 3) determining the amplitude of variation in the monitored strength for the given length of time; 4) transmitting to the receiver 3 the frame that contains the ID information indicative of the identity of the each of the transceivers 2c-2e, the mean strength information indicative of the determined mean value of the strength, and the strength variation amplitude information indicative of the determined amplitude of variation in the strength.

At step 128, the controlling unit 33 determines whether two or more frames have been received thereby for a predetermined time period after outputting the second command signal.

If the determination at step 128 produces a "NO" answer, then the counter Nr2 is increased by one, and the process proceeds to step 135.

Here, as in the first embodiment, the counter Nr2 represents the number of retransmissions of the second command signal by the controlling unit 33, and is initially set to zero.

At step 135, the controlling unit 33 determines whether the counter Nr2 is less than 5.

If the determination at step 135 produces a "YES" answer, then the process returns to step 125 to retransmit the second command signal. On the contrary, if the determination at step 135 produces a "NO" answer, then the process directly goes to the end.

On the other hand, if the determination at step 128 produces a "YES" answer, then the process proceeds to step 130.

At step 130, the controlling unit 33 further determines whether three frames have been received thereby for the predetermined time period after outputting the second command signal.

If the determination at step 130 produces a "YES" answer, then the process proceeds to step 140b.

At step 140b, the controlling unit 33 identifies, for each of the three received frames, the wheel on which the transceiver (i.e., one of the transceivers 2c-2e) having transmitted the frame is mounted. In other words, the controlling unit 33 makes wheel identification for the transceivers 2c-2e.

More specifically, in the present embodiment, the controlling unit 33 retrieves all the ID information, mean strength information, and strength variation amplitude information from the received three frames. Then, the controlling unit 33 identifies that one of the three frames which contains the strength variation amplitude information indicating the smallest amplitude of variation in the strength of the second trigger signal as being transmitted by the transceiver 2e on the spare wheel 6e. Further, the controlling unit 33 identifies that one of the remaining two frames which contains the mean strength information indicating the lager mean value of the strength of the second trigger signal as being transmitted by the transceiver 2d on the RL wheel 6d, and the other as being transmitted by the transceiver 2c on the RR wheel 6c.

After the wheel identification, the controlling unit 33 registers in the RAM thereof the ID information contained in each of the three frames as the reference ID information of that one of the three transceivers 2c-2e which has transmitted the frame.

On the other hand, if the determination at step 130 produces a "NO" answer, the process proceeds to step 150.

At step 150, the controlling unit 33 retrieves the strength variation amplitude information from the received two frames, and determines whether both the amplitudes indicated by the strength variation amplitude information retrieved from the two frames are above a predetermined threshold Tamp.

Here, the predetermined threshold Tamp is so set as to be less than the amplitude for the transceiver 2c but considerably greater than zero.

If the determination at step 150 produces a "NO" answer, then the process proceeds to step 135. On the contrary, if the determination at step 150 produces a "YES" answer, then the process goes on to step 155.

At step 155, the controlling unit 33 further retrieves all the ID information and mean strength information from the two frames. Then, the controlling unit 33 identifies that one of the two frames which contains the mean strength information indicating the lager mean value of the strength of the second trigger signal as being transmitted by the transceiver 2d on the RL wheel 6d, and the other as being transmitted by the transceiver 2c on the RR wheel 6c.

After the wheel identification, the controlling unit 33 registers in the RAM thereof the ID information contained in each of the two frames as the reference ID information of that one of the two transceivers 2c and 2d which has transmitted the frame.

With the above-described wheel identification method according to the present embodiment, it is also possible to achieve the advantages of the tire inflation pressure detecting apparatus S1 described in the first embodiment.

Fifth Embodiment

Figure 15:
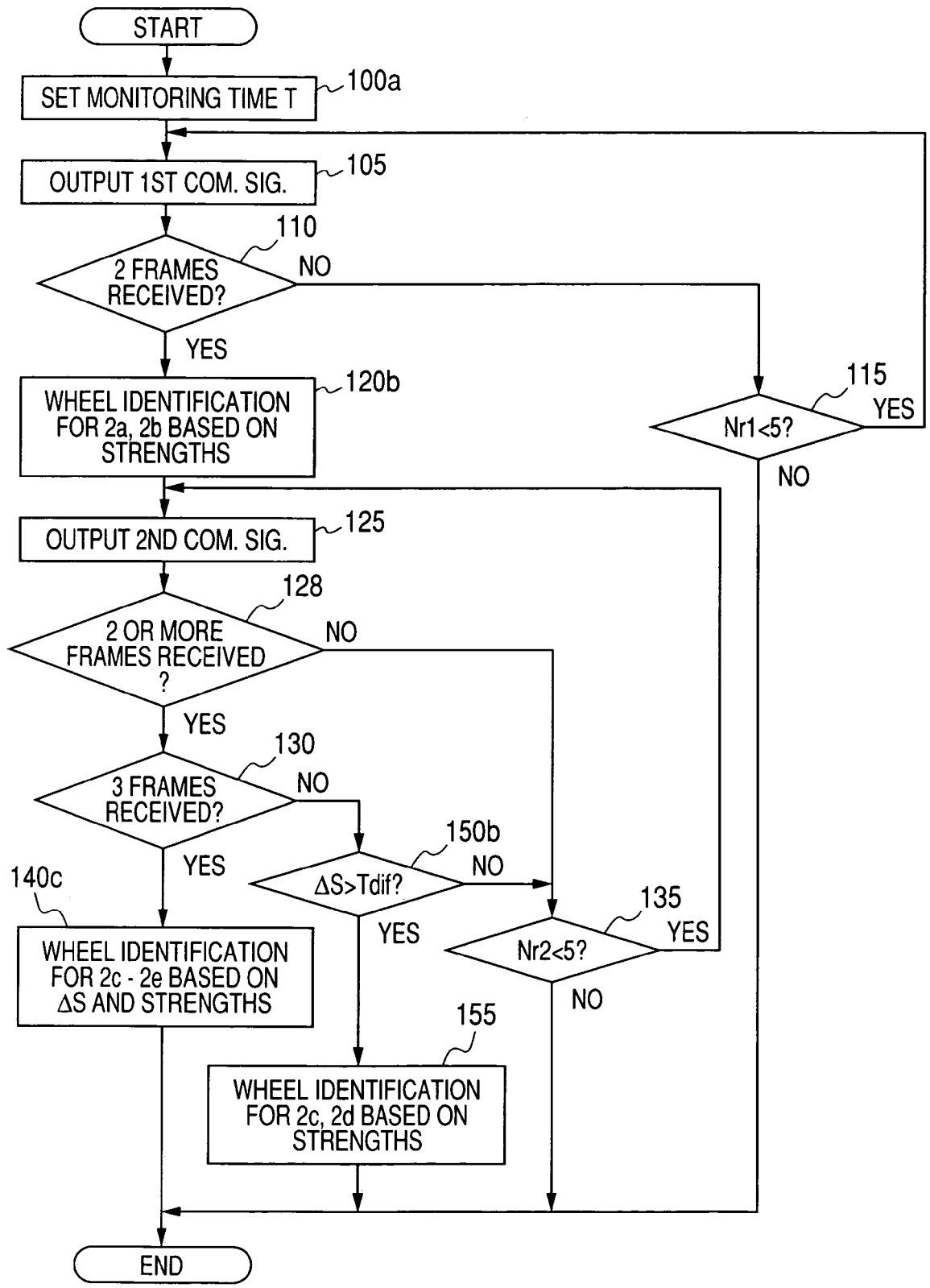
FIG. 15 is a flow chart illustrating a wheel identification process of the receiver according to the fifth embodiment of the invention.

FIG. 15 shows a wheel identification process of the controlling unit 33 of the receiver 3 according to the fifth embodiment of the invention. This process is a combination of the process shown in FIG. 10 and described in the second embodiment and the process shown in FIG. 14 and described in the fourth embodiment.

First, at step 100a, the controlling unit 33 sets a monitoring time T based on the running speed Vs of the vehicle 1.

At step 105, the controlling unit 33 outputs to the triggering device 5a the first command signal which contains time information indicative of the monitoring time T set at step 100a.

In response to receipt of the first command signal, the triggering device 5a continuously transmits for a predetermined time period to the transceivers 2a and 2b the first trigger signal which also contains the time information indicative of the monitoring time T. Further, in response to receipt of the first trigger signal, each of the transceivers 2a and 2b performs processes including: 1) determining the monitoring time T based on the time information contained in the first trigger signal; 2) monitoring the strength of the first trigger signal thereat for the monitoring time T; 3) determining the mean value of the monitored strength for the monitoring time T; 4) determining the difference ΔS between the maximum and minimum values of the monitored strength for the monitoring time T; and 5) transmitting to the receiver 3 a frame which contains the ID information indicative of the identity of the each of the transceivers 2a and 2b, the mean strength information indicative of the determined mean value of the strength, and the strength difference information indicative of the determined difference ΔS.

At step 110, the controlling unit 33 determines whether two frames have been received thereby for a predetermined time period after outputting the first command signal.

If the determination at step 110 produces a "NO" answer, then the counter Nr1 is increased by one, and the process proceeds to step 115.

Here, the counter Nr1 represents the number of retransmissions of the first command signal by the controlling unit 33, and is initially set to zero.

At step 115, the controlling unit 33 determines whether the counter Nr1 is less than 5.

If the determination at step 115 produces a "YES" answer, then the process returns to step 105 to retransmit the first command signal. On the contrary, if the determination at step 115 produces a "NO" answer, then the process directly goes to the end.

On the other hand, if the determination at step 110 produces a "YES" answer, then the process proceeds to step 120b.

At step 120b, the controlling unit 33 makes wheel identification for the transceivers 2a and 2b in the same way as in the fourth embodiment.

More specifically, the controlling unit 33 retrieves all the ID information and mean strength information from the two received frames. Then, the controlling unit 33 determines that one of the two frames which contains the mean strength information indicating the lager mean value of the strength of the first trigger signal as being transmitted by the transceiver 2b on the FL wheel 6b, and the other as being transmitted by the transceiver 2a on the FR wheel 6a.

After the wheel identification, the controlling unit 33 registers in the RAM thereof the ID information contained in each of the two frames as the reference ID information of that one of the two transceivers 2a and 2b which has transmitted the frame.

At step 125, the controlling unit 33 outputs to the triggering device 5b the second command signal which contains the time information indicative of the monitoring time T set at step 100a.

In response to receipt of the second command signal, the triggering device 5b continuously transmits for a predetermined time period to the transceivers 2c-2e the second trigger signal which also contains the time information indicative of the monitoring time T. Further, in response to receipt of the second trigger signal, each of the transceivers 2c-2e performs processes including: 1) determining the monitoring time T based on the time information contained in the second trigger signal; 2) monitoring the strength of the second trigger signal thereat for the monitoring time T; 3) determining the mean value of the monitored strength for the monitoring time T; 4) determining the difference ΔS between the maximum and minimum values of the monitored strength for the monitoring time T; and 5) transmitting to the receiver 3 a frame which contains the ID information indicative of the identity of the each of the transceivers 2c-2e, the mean strength information indicative of the determined mean value of the strength, and the strength difference information indicative of the determined difference ΔS.

At step 128, the controlling unit 33 determines whether two or more frames have been received thereby for a predetermined time period after outputting the second command signal.

If the determination at step 128 produces a "NO" answer, then the counter Nr2 is increased by one, and the process proceeds to step 135.

Here, the counter Nr2 represents the number of retransmissions of the second command signal by the controlling unit 33, and is initially set to zero.

At step 135, the controlling unit 33 determines whether the counter Nr2 is less than 5.

If the determination at step 135 produces a "YES" answer, then the process returns to step 125 to retransmit the second command signal. On the contrary, if the determination at step 135 produces a "NO" answer, then the process directly goes to the end.

On the other hand, if the determination at step 128 produces a "YES" answer, then the process proceeds to step 130.

At step 130, the controlling unit 33 further determines whether three frames have been received thereby for the predetermined time period after outputting the second command signal.

If the determination at step 130 produces a "YES" answer, then the process proceeds to step 140c.

At step 140c, the controlling unit 33 makes wheel identification for the transceivers 2c-2e.

More specifically, in the present embodiment, the controlling unit 33 retrieves all the ID information, mean strength information, and strength difference information from the received three frames. Then, the controlling unit 33 identifies that one of the three frames which contains the strength difference information indicating the smallest difference ΔS as being transmitted by the transceiver 2e on the spare wheel 6e. Further, the controlling unit 33 identifies that one of the remaining two frames which contains the mean strength information indicating the lager mean value of the strength of the second trigger signal as being transmitted by the transceiver 2d on the RL wheel 6d, and the other as being transmitted by the transceiver 2c on the RR wheel 6c.

After the wheel identification, the controlling unit 33 registers in the RAM thereof the ID information contained in each of the three frames as the reference ID information of that one of the three transceivers 2c-2e which has transmitted the frame.

On the other hand, if the determination at step 130 produces a "NO" answer, the process proceeds to step 150b.

At step 150b, the controlling unit 33 retrieves the strength difference information from the received two frames, and determines whether both the differences ΔS indicated by the strength difference information retrieved from the two frames are above a predetermined threshold Tdif.

Here, the predetermined threshold Tdif is so set as to be less than the differences ΔS for the transceiver 2c but considerably greater than zero.

If the determination at step 150b produces a "NO" answer, then the process proceeds to step 135. On the contrary, if the determination at step 150b produces a "YES" answer, then the process goes on to step 155.

At step 155, the controlling unit 33 further retrieves all the ID information and mean strength information from the two frames. Then, the controlling unit 33 identifies that one of the two frames which contains the mean strength information indicating the lager mean value of the strength of the second trigger signal as being transmitted by the transceiver 2d on the RL wheel 6d, and the other as being transmitted by the transceiver 2c on the RR wheel 6c.

After the wheel identification, the controlling unit 33 registers in the RAM thereof the ID information contained in each of the two frames as the reference ID information of that one of the two transceivers 2c and 2d which has transmitted the frame.

With the above-described wheel identification method according to the present embodiment, it is also possible to achieve the advantages of the tire inflation pressure detecting apparatus S1 described in the first embodiment.

Other Embodiments

While the above particular embodiments of the invention have been shown and described, it will be understood by those skilled in the art that various modifications, changes, and improvements may be made without departing from the spirit of the invention.

1) In the first embodiment, the tire inflation pressure detecting apparatus S1 includes two triggering devices 5a and 5b.

However, the tire inflation pressure detecting apparatus S1 may also be configured to include only a single triggering device which is located on the body 7 of the vehicle 1 at different distances from the running wheels 6a-6d of the vehicle 1.

With this configuration, it is also possible for the receiver 3 to perform wheel identification for the transceivers 2a-2e based on the amplitudes of variation in the strengths of the trigger signal at the transceivers 2a-2e.

2) In the first embodiment, the triggering devices 5a and 5b are both located on the left side of the longitudinal centerline C-C of the vehicle 1.

However, the triggering devices 5a and 5b may also be both located on the right side of the longitudinal centerline C-C. Moreover, it is also possible to locate one of the triggering devices 5a and 5b on the right side and the other on the left side of the longitudinal centerline C-C.

3) In the previous embodiments, the receiver 3 includes only the single receiving antenna 31 to receive all the frames transmitted by the transceivers 2a-2e.

However, the receiver 3 may also have a different number of receiving antennas 31. For example, the receiver 3 may include four receiving antennas 31, each of which corresponds to one of the four running wheels 6a-6d of the vehicle 1.

It should be appreciated that the present invention is particularly effective in the case where the receiver 3 includes only the single receiving antenna 31 and it is thus difficult for the receiver 3 to distinguish the frames received via the single receiving antenna 31 from one another.

4) In the first embodiment, the tire inflation pressure detecting apparatus S1 starts the wheel identification operation after the predetermined time from the turning of the ignition switch from off to on.

However, the tire inflation pressure detecting apparatus S1 may also perform the wheel identification operation at other timings, for example immediately after a tire replacement or rotation for the vehicle 1.

In addition, the receiver 3 may detect a tire replacement or rotation for the vehicle 1 based on a signal that is output from an inclination angle sensor provided on the vehicle 1 and indicates the inclination angel of the vehicle 1.

5) In the first embodiment, the tire inflation pressure detecting apparatus S1 is used in the vehicle 1 which includes the four running wheels 6a-6d and the single spare wheel 6e.

However, the present invention may also be applied to a vehicle which has a different number of running wheels, for example six, or to a vehicle which includes no spare wheel.

6) In the first embodiment, each of the transceivers 2a-2e includes the transmitting unit 23, the receiving unit 25, the transmitting antenna 26, and the receiving antenna 27. This is because the frequency at which the first and second trigger signals are transmitted is different from that at which the frames are transmitted.

However, when the two frequencies are the same, it is also possible to integrate the transmitting unit 23 and the receiving unit 25 into a single transmitting/receiving unit and the transmitting antenna 26 and the receiving antenna 27 into a single transmitting/receiving antenna.

7) In the first embodiment, the tire inflation pressure detecting apparatus S1 is configured to operate in the two modes, i.e., the ID registration mode and the periodic transmission mode.

However, the tire inflation pressure detecting apparatus S1 may also be configured to operate only in a single mode in which: each of the transceivers 2a-2e periodically transmits a frame that contains the tire pressure information and strength variation amplitude information, but no ID information; the receiver 3 identifies, for each of the frames received from the transceivers 2a-2e, the wheel on which the transceiver (i.e., one of the transceivers 2a-2e) having transmitted the frame is located based on the strength variation amplitude information contained in the frame; the receiver 3 further determines, for each of the frames, the inflation pressure of the associated tire based on the tire pressure information contained in the frame.

With such a configuration, it is possible to automatically and accurately detect the locations as well as the inflation pressures of the tires without using any ID information.

What is claimed is:

1. A wheel identifying apparatus for a vehicle which includes a body, two front wheels, two rear wheels, and a spare wheel located on the body closer to the rear wheels than the front wheels, the wheel identifying apparatus comprising:
   a first triggering device that is located on the body of the vehicle closer to the front wheels than the rear wheels and at different distances from the front wheels;
   a second triggering device that is located on the body of the vehicle closer to the rear wheels than the front wheels and at different distances from the rear wheels;
   five transceivers each of which is located on a corresponding one of the five wheels of the vehicle away from a rotational axis of the corresponding wheel;
   a receiver located on the body of the vehicle; and
   a wheel identifier located on the body of the vehicle,
   wherein the wheel identifying apparatus is so configured that:
   the first triggering device continuously transmits a first trigger signal to the transceivers on the front wheels for a first predetermined time period during running of the vehicle;
   in response to receipt of the first trigger signal, each of the transceivers on the front wheels monitors the strength of the first trigger signal thereat for a given length of time, determines a first physical quantity which represents variation in the monitored strength of the first trigger signal, and transmits a first response signal which indicates the determined first physical quantity;
   the receiver receives the two first response signals respectively transmitted by the transceivers on the front wheels;
   the wheel identifier identifies, for each of the two first response signals received by the receiver, the front wheel on which the transceiver having transmitted the first response signal is located through a comparison between the first physical quantities indicated by the two first response signals;
   the second triggering device continuously transmits a second trigger signal to the three transceivers on the rear and spare wheels for a second predetermined time period during running of the vehicle;
   in response to receipt of the second trigger signal, each of the three transceivers on the rear and spare wheels monitors the strength of the second trigger signal thereat for the given length of time, determines a second physical quantity which represents variation in the monitored strength of the second trigger signal, and transmits a second response signal which indicates the determined second physical quantity;
   the receiver receives the three second response signals respectively transmitted by the three transceivers on the rear and spare wheels; and
   the wheel identifier identifies, for each of the three second response signals received by the receiver, that one of the rear and spare wheels on which the transceiver having transmitted the second response signal is located through a comparison between the second physical quantities indicated by the three second response signals.

2. The wheel identifying apparatus as set forth in claim 1, wherein among the three transceivers on the rear and spare wheels, the wheel identifier identifies:
   the transceiver which has transmitted the second response signal indicating the smallest second physical quantity as being located on the spare wheel;
   the transceiver which has transmitted the second response signal indicating the largest second physical quantity as being located on the closer one of the rear wheels to the second triggering device; and
   the remaining transceiver as being located on the farther one of the rear wheels to the second triggering device.

3. The wheel identifying apparatus as set forth in claim 1, further comprising a running speed determiner that determines a running speed of the vehicle, wherein both the first and second triggering devices respectively transmit the first and second trigger signals only when the running speed of the vehicle determined by the running speed determiner is above a predetermined value.

4. The wheel identifying apparatus as set forth in claim 1, wherein the first physical quantity determined for each of the transceivers on the front wheels is an amplitude of the variation in the monitored strength of the first trigger signal for the given length of time, and
   the second physical quantity determined for each of the three transceivers on the rear and spare wheels is an amplitude of the variation in the monitored strength of the second trigger signal for the given length of time.

5. The wheel identifying apparatus as set forth in claim 1, wherein the receiver and the wheel identifier are integrated into a single device.

6. The wheel identifying apparatus as set forth in claim 1, wherein the wheel identifying apparatus is incorporated in a tire inflation pressure detecting apparatus which comprises:
   five pressure sensors each of which is provided on one of the five wheels of the vehicle to sense an inflation pressure of a tire fitted on the wheel; and
   a tire pressure determiner provided on the body of the vehicle,
   wherein the tire inflation pressure detecting apparatus is so configured that:
   each of the transceivers also transmits tire pressure information indicating the inflation pressure of the tire sensed by that one of the pressure sensors which is on the same wheel as the transceiver;
   the receiver receives and provides to the tire pressure determiner all the tire pressure information transmitted by the transceivers; and
   the tire pressure determiner determines the inflation pressure of each of the tires based on the tire pressure information transmitted by that one of the transceivers which is on the same wheel as the tire.

7. The wheel identifying apparatus as set forth in claim 6, wherein the pair of one of the transceivers and one of the pressure sensors on each of the five wheels is integrated into a single device, and
   the receiver, the wheel identifier, and the tire pressure determiner are integrated into a single device.

8. A wheel identifying apparatus for a vehicle which includes a body, two front wheels, two rear wheels, and a spare wheel located on the body closer to the rear wheels than the front wheels, the wheel identifying apparatus comprising:
   a first triggering device that is located on the body of the vehicle closer to the front wheels than the rear wheels and at different distances from the front wheels;
   a second triggering device that is located on the body of the vehicle closer to the rear wheels than the front wheels and at different distances from the rear wheels;
   five transceivers each of which is located on a corresponding one of the five wheels of the vehicle away from a rotational axis of the corresponding wheel;
   a monitoring time setter located on the body of the vehicle;
   a receiver located on the body of the vehicle; and
   a wheel identifier located on the body of the vehicle,
   wherein the wheel identifying apparatus is so configured that:
   the monitoring time setter sets a monitoring time according to a running speed of the vehicle;
   the first triggering device continuously transmits a first trigger signal to the transceivers on the front wheels for a first predetermined time period during running of the vehicle, the first trigger signal indicating the monitoring time set by the monitoring time setter;
   in response to receipt of the first trigger signal, each of the transceivers on the front wheels monitors the strength of the first trigger signal thereat for the monitoring time indicated by the first trigger signal, determines a first physical quantity which represents variation in the monitored strength of the first trigger signal, and transmits a first response signal which indicates the determined first physical quantity;
   the receiver receives the two first response signals respectively transmitted by the transceivers on the front wheels;
   the wheel identifier identifies, for each of the two first response signals received by the receiver, the front wheel on which the transceiver having transmitted the first response signal is located through a comparison between the first physical quantities indicated by the two first response signals;
   the second triggering device continuously transmits a second trigger signal to the three transceivers on the rear and spare wheels for a second predetermined time period during running of the vehicle, the second trigger signal also indicating the monitoring time set by the monitoring time setter;
   in response to receipt of the second trigger signal, each of the three transceivers on the rear and spare wheels monitors the strength of the second trigger signal thereat for the monitoring time indicated by the second trigger signal, determines a second physical quantity which represents variation in the monitored strength of the second trigger signal, and transmits a second response signal which indicates the determined second physical quantity;
   the receiver receives the three second response signals respectively transmitted by the three transceivers on the rear and spare wheels; and
   the wheel identifier identifies, for each of the three second response signals received by the receiver, that one of the rear and spare wheels on which the transceiver having transmitted the second response signal is located through a comparison between the second physical quantities indicated by the three second response signals.

9. The wheel identifying apparatus as set forth in claim 8, wherein among the three transceivers on the rear and spare wheels, the wheel identifier identifies:

the transceiver which has transmitted the second response signal indicating the smallest second physical quantity as being located on the spare wheel;

the transceiver which has transmitted the second response signal indicating the largest second physical quantity as being located on the closer one of the rear wheels to the second triggering device; and the remaining transceiver as being located on the farther one of the rear wheels to the second triggering device.

10. The wheel identifying apparatus as set forth in claim 8, wherein the monitoring time setter sets the monitoring time by the following steps:

determining a rotation time that is required each of the front and rear wheels of the vehicle to make one revolution at the running speed of the vehicle;

comparing the rotation time with a predetermined threshold; and setting the monitoring time to the rotation time when the rotation time is less than or equal to the predetermined threshold, and to the predetermined threshold otherwise.

11. The wheel identifying apparatus as set forth in claim 8, wherein the first physical quantity determined for each of the transceivers on the front wheels is a difference between the maximum and minimum values of the monitored strength of the first trigger signal for the monitoring time, and the second physical quantity determined for each of the three transceivers on the rear and spare wheels is a difference between the maximum and minimum values of the monitored strength of the second trigger signal for the monitoring time.

12. The wheel identifying apparatus as set forth in claim 8, wherein the monitoring time setter, the receiver, and the wheel identifier are integrated into a single device.

13. The wheel identifying apparatus as set forth in claim 8, wherein the wheel identifying apparatus is incorporated in a tire inflation pressure detecting apparatus which comprises:

five pressure sensors each of which is provided on one of the five wheels of the vehicle to sense an inflation pressure of a tire fitted on the wheel; and a tire pressure determiner provided on the body of the vehicle, wherein the tire inflation pressure detecting apparatus is so configured that:

each of the transceivers also transmits tire pressure information indicating the inflation pressure of the tire sensed by that one of the pressure sensors which is on the same wheel as the transceiver;

the receiver receives and provides to the tire pressure determiner all the tire pressure information transmitted by the transceivers; and the tire pressure determiner determines the inflation pressure of each of the tires based on the tire pressure information transmitted by that one of the transceivers which is on the same wheel as the tire.

14. The wheel identifying apparatus as set forth in claim 13, wherein the pair of one of the transceivers and one of the pressure sensors on each of the five wheels is integrated into a single device, and the monitoring time setter, the receiver, the wheel identifier, and the tire pressure determiner are integrated into a single device.

15. A wheel identifying apparatus for a vehicle which includes a body, two front wheels, two rear wheels, and a spare wheel located on the body closer to the rear wheels than the front wheels, the wheel identifying apparatus comprising:

a first triggering device that is located on the body of the vehicle closer to the front wheels than the rear wheels and at different distances from the front wheels;

a second triggering device that is located on the body of the vehicle closer to the rear wheels than the front wheels and at different distances from the rear wheels;

five transceivers each of which is located on a corresponding one of the five wheels of the vehicle away from a rotational axis of the corresponding wheel;

a receiver located on the body of the vehicle; and a wheel identifier located on the body of the vehicle, wherein the wheel identifying apparatus is so configured that:

the first triggering device continuously transmits a first trigger signal to the transceivers on the front wheels for a first predetermined time period during running of the vehicle;

in response to receipt of the first trigger signal, each of the transceivers on the front wheels monitors the strength of the first trigger signal thereat for a given length of time, determines a value of the monitored strength of the first trigger signal, and transmits a first response signal which indicates the determined value of the strength of the first trigger signal;

the receiver receives the two first response signals respectively transmitted by the transceivers on the front wheels;

the wheel identifier identifies, for each of the two first response signals received by the receiver, the front wheel on which the transceiver having transmitted the first response signal is located through a comparison between the values of the strength of the first trigger signal indicated by the two first response signals;

the second triggering device continuously transmits a second trigger signal to the three transceivers on the rear and spare wheels for a second predetermined time period during running of the vehicle;

in response to receipt of the second trigger signal, each of the three transceivers on the rear and spare wheels monitors the strength of the second trigger signal thereat for the given length of time, determines a value of the monitored strength of the second trigger signal, determines a physical quantity which represents variation in the monitored strength of the second trigger signal, and transmits a second response signal which indicates both the determined value of the strength of the second trigger signal and the determined physical quantity;

the receiver receives the three second response signals respectively transmitted by the three transceivers on the rear and spare wheels; and the wheel identifier identifies, for each of the three second response signals received by the receiver, that one of the rear and spare wheels on which the transceiver having transmitted the second response signal is located through comparisons between the values of the strength of the second trigger signal indicated by the three second response signals and between the physical quantities indicated by the three second response signals.

16. The wheel identifying apparatus as set forth in claim 15, wherein among the three transceivers on the rear and spare wheels, the wheel identifier identifies:

the transceiver which has transmitted the second response signal indicating the smallest physical quantity as being located on the spare wheel; and that one of the remaining two transceivers which has transmitted the second response signal indicating the larger value of the strength of the second trigger signal as being located on the closer one of the rear wheels to the second triggering device, and the other as being located on the other rear wheel.

17. The wheel identifying apparatus as set forth in claim 15, further comprising a running speed determiner that determines a running speed of the vehicle, wherein both the first and second triggering devices respectively transmit the first and second trigger signals only when the running speed of the vehicle determined by the running speed determiner is above a predetermined value.

18. The wheel identifying apparatus as set forth in claim 15, wherein the physical quantity determined for each of the three transceivers on the rear and spare wheels is an amplitude of the variation in the monitored strength of the second trigger signal for the given length of time.

19. The wheel identifying apparatus as set forth in claim 15, wherein the receiver and the wheel identifier are integrated into a single device.

20. The wheel identifying apparatus as set forth in claim 15, wherein the wheel identifying apparatus is incorporated in a tire inflation pressure detecting apparatus which comprises:
   five pressure sensors each of which is provided on one of the five wheels of the vehicle to sense an inflation pressure of a tire fitted on the wheel; and
   a tire pressure determiner provided on the body of the vehicle,
   wherein the tire inflation pressure detecting apparatus is so configured that:
   each of the transceivers also transmits tire pressure information indicating the inflation pressure of the tire sensed by that one of the pressure sensors which is on the same wheel as the transceiver;
   the receiver receives and provides to the tire pressure determiner all the tire pressure information transmitted by the transceivers; and
   the tire pressure determiner determines the inflation pressure of each of the tires based on the tire pressure information transmitted by that one of the transceivers which is on the same wheel as the tire.

21. The wheel identifying apparatus as set forth in claim 20, wherein the pair of one of the transceivers and one of the pressure sensors on each of the five wheels is integrated into a single device, and
   the receiver, the wheel identifier, and the tire pressure determiner are integrated into a single device.

22. A wheel identifying apparatus for a vehicle which includes a body, two front wheels, two rear wheels, and a spare wheel located on the body closer to the rear wheels than the front wheels, the wheel identifying apparatus comprising:
   a first triggering device that is located on the body of the vehicle closer to the front wheels than the rear wheels and at different distances from the front wheels;
   a second triggering device that is located on the body of the vehicle closer to the rear wheels than the front wheels and at different distances from the rear wheels;
   five transceivers each of which is located on a corresponding one of the five wheels of the vehicle away from a rotational axis of the corresponding wheel;
   a monitoring time setter located on the body of the vehicle;
   a receiver located on the body of the vehicle; and
   a wheel identifier located on the body of the vehicle,
   wherein the wheel identifying apparatus is so configured that:
   the monitoring time setter sets a monitoring time according to a running speed of the vehicle;
   the first triggering device continuously transmits a first trigger signal to the transceivers on the front wheels for a first predetermined time period during running of the vehicle, the first trigger signal indicating the monitoring time set by the monitoring time setter;
   in response to receipt of the first trigger signal, each of the transceivers on the front wheels monitors the strength of the first trigger signal thereat for the monitoring time indicated by the first trigger signal, determines a value of the monitored strength of the first trigger signal, and transmits a first response signal which indicates the determined value of the strength of the first trigger signal;
   the receiver receives the two first response signals respectively transmitted by the transceivers on the front wheels;
   the wheel identifier identifies, for each of the two first response signals received by the receiver, the front wheel on which the transceiver having transmitted the first response signal is located through a comparison between the values of the strength of the first trigger signal indicated by the two first response signals;
   the second triggering device continuously transmits a second trigger signal to the three transceivers on the rear and spare wheels for a second predetermined time period during running of the vehicle, the second trigger signal also indicating the monitoring time set by the monitoring time setter;
   in response to receipt of the second trigger signal, each of the three transceivers on the rear and spare wheels monitors the strength of the second trigger signal thereat for the monitoring time indicated by the second trigger signal, determines a value of the monitored strength of the second trigger signal, determines a physical quantity which represents variation in the monitored strength of the second trigger signal, and transmits a second response signal which indicates both the determined value of the strength of the second trigger signal and the determined physical quantity;
   the receiver receives the three second response signals respectively transmitted by the three transceivers on the rear and spare wheels; and
   the wheel identifier identifies, for each of the three second response signals received by the receiver, that one of the rear and spare wheels on which the transceiver having transmitted the second response signal is located through comparisons between the values of the strength of the second trigger signal indicated by the three second response signals and between the physical quantities indicated by the three second response signals.

23. The wheel identifying apparatus as set forth in claim 22, wherein among the three transceivers on the rear and spare wheels, the wheel identifier identifies:
   the transceiver which has transmitted the second response signal indicating the smallest physical quantity as being located on the spare wheel; and
   that one of the remaining two transceivers which has transmitted the second response signal indicating the larger value of the strength of the second trigger signal as being located on the closer one of the rear wheels to the second triggering device, and the other as being located on the other rear wheel.

24. The wheel identifying apparatus as set forth in claim 22, wherein the monitoring time setter sets the monitoring time by the following steps:
   determining a rotation time that is required each of the front and rear wheels of the vehicle to make one revolution at the running speed of the vehicle;

comparing the rotation time with a predetermined threshold; and
setting the monitoring time to the rotation time when the rotation time is less than or equal to the predetermined threshold, and to the predetermined threshold otherwise.

25. The wheel identifying apparatus as set forth in claim 22, wherein the physical quantity determined for each of the three transceivers on the rear and spare wheels is a difference between the maximum and minimum values of the monitored strength of the second trigger signal for the monitoring time.

26. The wheel identifying apparatus as set forth in claim 22, wherein the monitoring time setter, the receiver, and the wheel identifier are integrated into a single device.

27. The wheel identifying apparatus as set forth in claim 22, wherein the wheel identifying apparatus is incorporated in a tire inflation pressure detecting apparatus which comprises:
  five pressure sensors each of which is provided on one of the five wheels of the vehicle to sense an inflation pressure of a tire fitted on the wheel; and
  a tire pressure determiner provided on the body of the vehicle,
  wherein the tire inflation pressure detecting apparatus is so configured that:
  each of the transceivers also transmits tire pressure information indicating the inflation pressure of the tire sensed by that one of the pressure sensors which is on the same wheel as the transceiver;
  the receiver receives and provides to the tire pressure determiner all the tire pressure information transmitted by the transceivers; and
  the tire pressure determiner determines the inflation pressure of each of the tires based on the tire pressure information transmitted by that one of the transceivers which is on the same wheel as the tire.

28. The wheel identifying apparatus as set forth in claim 27, wherein the pair of one of the transceivers and one of the pressure sensors on each of the five wheels is integrated into a single device, and
  the monitoring time setter, the receiver, the wheel identifier, and the tire pressure determiner are integrated into a single device.

29. A wheel identifying apparatus comprising:
  two transceivers that are respectively located on two running wheels of a vehicle away from a rotational axis of the respective wheel;
  a triggering device located on a body of the vehicle at different distances from the running wheels;
  a receiver located on the body of the vehicle; and
  a wheel identifier located on the body of the vehicle,
  wherein the wheel identifying apparatus is so configured that:
  the triggering device continuously transmits a trigger signal to the transceivers for a predetermined time period during running of the vehicle;
  in response to receipt of the trigger signal, each of the transceivers monitors the strength of the trigger signal thereat for a given length of time, determines a physical quantity which represents variation in the monitored strength of the trigger signal, and transmits a response signal which indicates the determined physical quantity;
  the receiver receives and provides to the wheel identifier the two response signals transmitted by the two transceivers; and
  the wheel identifier identifies that one of the two transceivers which has transmitted the response signal indicating the larger physical quantity as being located on the closer one of the two running wheels to the triggering device, and the other as being located on the other running wheel.

30. The wheel identifying apparatus as set forth in claim 29, wherein the physical quantity determined for each of the transceivers is an amplitude of the variation in the monitored strength of the trigger signal for the given length of time.

31. A wheel identifying apparatus comprising:
  two transceivers that are respectively located on two running wheels of a vehicle away from a rotational axis of the respective wheel;
  a triggering device located on a body of the vehicle at different distances from the running wheels;
  a monitoring time setter located on the body of the vehicle;
  a receiver located on the body of the vehicle; and
  a wheel identifier located on the body of the vehicle,
  wherein the wheel identifying apparatus is so configured that:
  the monitoring time setter sets a monitoring time according to a running speed of the vehicle;
  the triggering device continuously transmits a trigger signal to the transceivers for a predetermined time period during running of the vehicle, the trigger signal indicating the monitoring time set by the monitoring time setter;
  in response to receipt of the trigger signal, each of the transceivers monitors the strength of the trigger signal thereat for the monitoring time indicated by the trigger signal, determines a physical quantity which represents variation in the monitored strength of the trigger signal, and transmits a response signal which indicates the determined physical quantity;
  the receiver receives and provides to the wheel identifier the two response signals transmitted by the two transceivers; and
  the wheel identifier identifies that one of the two transceivers which has transmitted the response signal indicating the larger physical quantity as being located on the closer one of the two running wheels to the triggering device, and the other as being located on the other running wheel.

32. The wheel identifying apparatus as set forth in claim 31, wherein the physical quantity determined for each of the transceivers is a difference between the maximum and minimum values of the monitored strength of the trigger signal for the monitoring time.

33. A wheel identifying apparatus comprising:
  two transceivers that are respectively located on a running wheel and a spare wheel of a vehicle away from a rotational axis of the respective wheel;
  a triggering device located on a body of the vehicle;
  a receiver located on the body of the vehicle; and
  a wheel identifier located on the body of the vehicle,
  wherein the wheel identifying apparatus is so configured that:
  the triggering device continuously transmits a trigger signal to the transceivers for a predetermined time period during running of the vehicle;
  in response to receipt of the trigger signal, each of the transceivers monitors the strength of the trigger signal thereat for a given length of time, determines a physical quantity which represents variation in the monitored strength of the trigger signal, and transmits a response signal which indicates the determined physical quantity;
  the receiver receives and provides to the wheel identifier the two response signals transmitted by the two transceivers; and the wheel identifier identifies that one of the two transceivers which has transmitted the response signal indicating the smaller physical quantity as being located on the spare wheel, and the other as being located on the running wheel.

34. The wheel identifying apparatus as set forth in claim 33, wherein the physical quantity determined for each of the transceivers is an amplitude of the variation in the monitored strength of the trigger signal for the given length of time.

35. A wheel identifying apparatus comprising:
two transceivers that are respectively located on a running wheel and a spare wheel of a vehicle away from a rotational axis of the respective wheel;
a triggering device located on a body of the vehicle;
a monitoring time setter located on the body of the vehicle;
a receiver located on the body of the vehicle; and
a wheel identifier located on the body of the vehicle,
wherein the wheel identifying apparatus is so configured that:
the monitoring time setter sets a monitoring time according to a running speed of the vehicle;
the triggering device continuously transmits a trigger signal to the transceivers for a predetermined time period during running of the vehicle, the trigger signal indicating the monitoring time set by the monitoring time setter;
in response to receipt of the trigger signal, each of the transceivers monitors the strength of the trigger signal thereat for the monitoring time indicated by the trigger signal, determines a physical quantity which represents variation in the monitored strength of the trigger signal, and transmits a response signal which indicates the determined physical quantity;
the receiver receives and provides to the wheel identifier the two response signals transmitted by the two transceivers; and
the wheel identifier identifies that one of the two transceivers which has transmitted the response signal indicating the smaller physical quantity as being located on the spare wheel, and the other transceiver as being located on the running wheel.

36. The wheel identifying apparatus as set forth in claim 35, wherein the physical quantity determined for each of the transceivers is a difference between the maximum and minimum values of the monitored strength of the trigger signal for the monitoring time.

* * * * *